(12) United States Patent
Rayner et al.

(10) Patent No.: US 10,279,307 B2
(45) Date of Patent: May 7, 2019

(54) SYSTEM FOR THE CAPTURE AND RELEASE OF ACID GASES

(71) Applicant: C-Capture Ltd, Leeds/Yorkshire (GB)

(72) Inventors: Christopher Mark Rayner, Leeds/Yorkshire (GB); Douglas Cahalane Barnes, Leeds/Yorkshire (GB); Gergely Jakab, Leeds/Yorkshire (GB); Caspar Schoolderman, Leeds/Yorkshire (GB)

(73) Assignee: C-Capture Ltd., Leeds/Yorkshire (GB)

( * ) Notice: Subject to any disclaimer, the term of this patent is extended or adjusted under 35 U.S.C. 154(b) by 3 days.

(21) Appl. No.: 15/105,773

(22) PCT Filed: Dec. 19, 2014

(86) PCT No.: PCT/GB2014/053786
§ 371 (c)(1),
(2) Date: Jun. 17, 2016

(87) PCT Pub. No.: WO2015/092427
PCT Pub. Date: Jun. 25, 2015

(65) Prior Publication Data
US 2017/0001142 A1    Jan. 5, 2017

(30) Foreign Application Priority Data

Dec. 19, 2013 (GB) .................................. 1322606.3

(51) Int. Cl.
*B01D 53/14* (2006.01)
*B01D 53/48* (2006.01)
(Continued)

(52) U.S. Cl.
CPC ..... *B01D 53/1425* (2013.01); *B01D 53/1456* (2013.01); *B01D 53/1475* (2013.01);
(Continued)

(58) Field of Classification Search
None
See application file for complete search history.

(56) References Cited

U.S. PATENT DOCUMENTS

| 2,176,441 A | 10/1939 | Ulrich et al. |
| 3,928,548 A | 12/1975 | Deschamps |

(Continued)

FOREIGN PATENT DOCUMENTS

| DE | 102010028480 A1 | 9/2011 | |
| WO | WO98/25688 | * 6/1998 | ............. B01D 53/62 |

(Continued)

OTHER PUBLICATIONS

"Safety Data Sheet for Triethanolamine." Sigma-Aldrich (2018). Obtained via "SDS" link present at https://www.sigmaaldrich.com/catalog/product/sigma/90279?lang=en&region=US.*

*Primary Examiner* — Daniel Berns
(74) *Attorney, Agent, or Firm* — Nexsen Pruet, PLLC; E. Eric Mills

(57) ABSTRACT

In one aspect, the invention provides a method for the capture of at least one acid gas in a composition, the release of said gas from said composition, and the subsequent regeneration of said composition for re-use, said method comprising performing, in order, the steps of: (a) capturing the at least one acid gas by contacting said at least one gas with a capture composition comprising at least one salt of a carboxylic acid and at least one water-miscible non-aqueous solvent; (b) releasing said at least one acid gas by adding at least one protic solvent or agent to said composition; and (c) regenerating the capture composition by partial or complete removal of said added protic solvent or agent from said composition. Optionally, said capture composition comprising at least one salt of a carboxylic acid and at least one water-miscible non-aqueous solvent additionally comprises water or another protic solvent. In another aspect, the (Continued)

CARBON CAPTURE CAPACITY OF SATURATED TETRABUTYLAMMONIUM ACETATE SOLUTIONS AS A FUNCTION OF THE WATER CONTENT invention envisages a composition which additionally comprises at least one protic solvent or agent and release of the at least one acid gas is achieved solely by subjecting the composition to the application of heat or stripping with a stream of air. The method is typically applied to the capture and subsequent release of carbon dioxide, and offers a convenient and simple process which uses inexpensive consumables and offers significant advantages over the methods of the prior art.

16 Claims, 10 Drawing Sheets

(51) Int. Cl.
    *B01D 53/62*     (2006.01)
    *B01D 53/96*     (2006.01)
    *C10L 3/10*     (2006.01)

(52) U.S. Cl.
CPC ......... *B01D 53/1493* (2013.01); *B01D 53/48* (2013.01); *B01D 53/62* (2013.01); *B01D 53/96* (2013.01); *C10L 3/104* (2013.01); *B01D 2251/30* (2013.01); *B01D 2251/302* (2013.01); *B01D 2251/304* (2013.01); *B01D 2251/306* (2013.01); *B01D 2251/40* (2013.01); *B01D 2251/80* (2013.01); *B01D 2252/103* (2013.01); *B01D 2252/20* (2013.01); *B01D 2252/202* (2013.01); *B01D 2252/2025* (2013.01); *B01D 2252/2041* (2013.01); *B01D 2252/2056* (2013.01); *B01D 2252/20447* (2013.01); *B01D 2252/20452* (2013.01); *B01D 2252/20484* (2013.01); *B01D 2252/20489* (2013.01); *B01D 2252/504* (2013.01); *B01D 2257/30* (2013.01); *B01D 2257/504* (2013.01); *C10L 2290/541* (2013.01); *Y02C 10/04* (2013.01); *Y02C 10/06* (2013.01); *Y02C 20/20* (2013.01)

(56) References Cited

U.S. PATENT DOCUMENTS

| | | | |
|---|---|---|---|
| 4,133,650 A | 1/1979 | Germerdonk | |
| 7,754,102 B2* | 7/2010 | Zhang | B01D 53/1475 252/184 |
| 2004/0253159 A1* | 12/2004 | Hakka | B01D 53/1475 423/228 |
| 2005/0129598 A1 | 6/2005 | Chinn | |
| 2006/0205928 A1* | 9/2006 | Sang | C07K 14/765 530/363 |
| 2007/0004821 A1* | 1/2007 | Bublewitz | A61K 6/10 523/109 |
| 2010/0028232 A1* | 2/2010 | Bedell | B01D 53/1487 423/242.2 |
| 2011/0214566 A1 | 9/2011 | Lee et al. | |
| 2013/0039829 A1 | 2/2013 | Ouimet | |
| 2013/0175471 A1* | 7/2013 | Wagner | B01D 53/1456 252/184 |

FOREIGN PATENT DOCUMENTS

| | | |
|---|---|---|
| WO | 2007001190 A1 | 1/2007 |
| WO | 2010049739 A2 | 5/2010 |
| WO | 2012067601 A1 | 5/2012 |
| WO | 2012139219 A1 | 10/2012 |

\* cited by examiner

CONVENTIONAL POST-COMBUSTION CAPTURE PROCESS

1 - Absorber
2 - Stripper (Desorber)
3 - Cooled flue gas
4 - Flue gas outlet
5 - Cooling water
6 - LP steam
7 - Reboiler
8 - Condensate a - $CO_2$ compression 3 bar
b - $CO_2$ compression 7 bar
c - $CO_2$ compression 16 bar
d - $CO_2$ compression 40 bar
e - $CO_2$ compression 58 bar
f - $CO_2$ compression 88 bar RATE OF $CO_2$ UPTAKE FOR 1M POTASSIUM BUTYRATE AND 1M TETRABUTYLAMMONIUM BUTYRATE CARBON CAPTURE CAPACITY OF SATURATED TETRABUTYLAMMONIUM ACETATE SOLUTIONS AS A FUNCTION OF THE WATER CONTENT VAPOUR LIQUID EQUILIBRIA OF A POTASSIUM PIVALATE SYSTEM IN SULFOLANE WITH VARYING WATER CONTENT VAPOUR LIQUID EQUILIBRIA OF A POTASSIUM PIVALATE SYSTEM IN ETHYLENE GLYCOL MONOBUTYL ETHER WITH VARYING WATER CONTENT

LOW TEMPERATURE CAPTURE PROCESS A

1 - Absorber
2 - Desorbers
3 - Cooled flue gas
4 - Flue gas outlet
5 - Cooling water
9 - Water
10 - Water Separation process
11 - Waste heat a - $CO_2$ compression 3 bar
b - $CO_2$ compression 7 bar
c - $CO_2$ compression 16 bar
d - $CO_2$ compression 40 bar
e - $CO_2$ compression 58 bar
f - $CO_2$ compression 88 bar 5 - Cooling water
12 - Wet mix solvent
13 - Dry mix solvent
14 - Permeate containing higher boiling point fraction
15 - Water rich phase
16 - Negative pressure

USE OF PERVAPORATION MEMBRANE FOR SOLVENT REGENERATION

12 - Wet mix solvent
13 - Dry mix solvent
15 - Water rich phase

USE OF CONVENTIONAL MEMBRANE FOR SOLVENT REGENERATION

5 - Cooling water
11 - Waste heat
12 - Wet mix solvent
13 - Dry mix solvent
15 - Water rich phase
17 - Carrier gas vapour

WATER SEPARATION USING HOT CARRIER GAS

LOW TEMPERATURE CAPTURE PROCESS B

CHANGES IN WATER CONTENT AFTER ADDITION OF SORBENT MATERIALS TO ORGANIC-WATER MIXTURES

SYSTEM FOR THE CAPTURE AND RELEASE OF ACID GASES

CROSS REFERENCE TO RELATED APPLICATIONS

This application is a 35 U.S.C. § 371 U.S. national phase entry of International Application No. PCT/GB2014/053786 having an international filing date of Dec. 19, 2014, which claims the benefit of Great Britain Application No. 1322606.3 filed Dec. 19, 2013, each of which is incorporated herein by reference in its entirety.

FIELD OF THE INVENTION

The present invention is concerned with a novel approach to the capture of carbon dioxide, and provides alternative materials which may be more conveniently and efficiently applied to the absorption and release of carbon dioxide gas and other acid gases.

BACKGROUND TO THE INVENTION

As a result of the increasing use of fossil fuels, the concentration of carbon dioxide in the atmosphere has risen from 280 ppm in pre-industrial times, to almost 400 ppm in 2013,[1,2] leading to rises in average global temperatures. This is expected to increase further in the short to mid-term until energy supplies which do not result in significant $CO_2$ emissions become established.[3] According to the International Energy Agency *World Energy Outlook* (2002), the predicted increase in combustion generated $CO_2$ emissions is around 1.8% per year and by 2030, if it continues at that rate, it will be 70% above 2000 levels.[4]

Hence, without significant abatement of $CO_2$ emissions, the global average temperature may increase by 1.4-5.8 K by 2100.[5] In view of the abundant global reserves of coal, this fuel is widely used for power generation in many countries around the world. However, for each unit of electricity generation, combustion of coal produces approximately double the amount of $CO_2$ when compared with natural gas. This problem is likely to be exacerbated in the future, because of the expected increase in coal burning for power generation units in order to sustain the economic growth of developing countries like China and India. Other substantial $CO_2$ producers include cement manufacturers, and ammonia production plants. Nevertheless, the major problem arises from coal fired power stations, with over 33% of current global $CO_2$ emissions arising from such plants, and this high percentage offers a real opportunity for the reduction of $CO_2$ emissions by capturing $CO_2$ at source,[6] concentrating it, and then handling it by storage in geological features (e.g. natural gas wells or the seabed), enhanced oil recovery, or sequestration—most likely by chemical or biochemical conversion into useful products (e.g. formic acid, methanol, polycarbonate plastics, polyhydroxyalkanoates, and biofuels).

The main current approach to absorption and stripping of $CO_2$ in packed columns is considered to be a mature technology, typically using aqueous monoethanolamine (30% w/w), or related amine blends, as absorption media.[4,5,7] However this approach has considerable problems, particularly when used to treat large volumes of flue gas with low $CO_2$ concentrations (typically 3-5% for natural gas and 10-15% for coal combustion), as the processes require the use of large sized equipment, thereby representing a major engineering challenge with high investment costs. The current processes are also highly energy intensive, usually requiring the temperature of the whole capture solvent to be raised from about 40° C. to around 120° C., the latter temperature being attained under pressure. The operation of processes at such temperatures and pressures also promotes solvent degradation, corrosion of equipment and environmental emissions.

Typical apparatus used in a conventional Post-Combustion Capture (PCC) process is shown in FIG. 1, wherein it will be seen that a lean solvent is contacted with a cooled flue gas in an absorber. The $CO_2$ is absorbed from the flue gas into the solvent, the resulting rich solvent is pumped through a lean-rich heat exchanger where the rich solvent is heated towards stripping temperatures of typically 90° to 115° C. by absorption of heat from the lean solvent. The $CO_2$ is then desorbed in the stripper with the aid of steam, the lean solvent is cooled with the rich solvent in the lean-rich heat exchanger, and the solvent is then further cooled to absorption temperature and fed back to the absorber. The $CO_2$ released from the stripper is subsequently cooled and the water vapour is condensed. Then the $CO_2$ is compressed, typically in six stages, from stripper pressure to the pressure required for, e.g. a $CO_2$ pipeline.

In a coal-fired power plant, typical energy consumption in the stripper reboiler can be as high as 15-30% of the power production. As a consequence, it has been calculated that application of current $CO_2$ capture technology to power plants would increase the price of electricity by as much as 70%.[2] In addition, the scale of $CO_2$ capture technology has to be potentially enormous to deal with the large volumes of flue gases to be processed. A large power station such as Drax in Yorkshire UK produces approximately 55,000 tonnes of $CO_2$ per day.[8] This corresponds to a volume of around 28M $m^3$ at atmospheric pressure which would require processing on a daily basis. On the basis that $CO_2$ represents 10-15% of a typical flue exhaust form coal firing the actual volume of gas to be processed would be typically 7-10 times this amount.[2]

In principle, the gas separation technologies which are currently used in the chemical industry, such as absorption in chemical solvents, adsorption using a solid adsorbent, membrane separation and cryogenic processes, can all be adapted for post-combustion capture of $CO_2$ from thermal power plants. Alternative approaches such as pre-combustion $CO_2$ capture, as in an integrated gasification and combined-cycle (IGCC) plant, and combustion using pure oxygen instead of air (known as oxyfuel combustion) for the production of sequestration-ready $CO_2$, are also being developed for this purpose.[7]

However, such technologies are either not yet fully developed for deployment (a number of demonstrator plants are currently in production), are not suitable for $CO_2$ removal from flue gases emanating from large power plants, or cannot be retrofitted to existing facilities. Consequently, the preferred option in the immediate future seems to be the post-combustion capture of $CO_2$ via absorption (scrubbing) in amine-based solvents with solvent regeneration by steam stripping, because this is already a well-established process which finds widespread use in the chemical industry.[4,5]

Although absorption/stripping is a mature technology,[9] it suffers from considerable problems when used to treat large volumes of flue gas. Despite widespread use of this technology, the underlying chemistry is only recently becoming more fully understood, mainly because of the complex behaviour of aqueous amine based systems.[10] The situation is further complicated by recent developments utilising mixed aqueous amine systems such as monoethanolamine (MEA) and N-methyldiethanolamine (MDEA),[11] and other blends containing, for example, piperazine (PZ) and 2-amino-2-methyl propanol (AMP).[12] However, whilst these materials give more favourable energy considerations, their relative expense, stability and volatility present potential drawbacks, and the energy requirements are still too high.[12,13]

Currently, aqueous MEA is widely used for $CO_2$ capture, and it typically serves as a benchmark for comparison with potential new systems; it also highlights some important issues with amine based approaches. Thus, it is known that MEA degrades after prolonged use, particularly due to the presence of residual oxygen in the flue gas stream. It is also important that the cost of solvent make-up should not be excessive in a viable commercial process. A wide variety of other solvents is also available, and the relative merits of these solvents, and other aspects, have been recently assessed.[12] Ammonia[14] would appear to offer some advantages over MEA and other amines in aqueous based systems, in terms of energy requirements, stability and disposal, although emissions control may be more challenging.

A consideration of the chemistry of amine-based solvents shows that there are three main routes by which amines can absorb $CO_2$, as illustrated in Scheme 1.[2,10]

Scheme 1

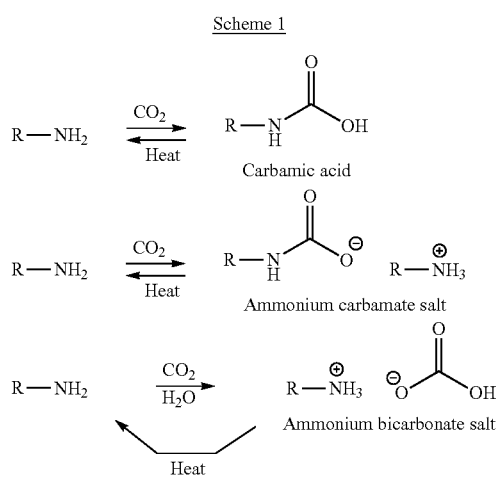

The particular mechanism which operates in any given situation depends on process considerations such as the presence of water or solvent, the concentration of amine and its structure, pH, and $CO_2$ concentration and pressure. In aqueous based systems it is likely that all three mechanisms are operating, but that the overall mechanism involves predominantly the carbamate salt and ammonium bicarbonate.[10] The carbamic acid is often favoured in solvents of high polarity (e.g. DMSO) but, otherwise, the ammonium carbamate is the dominant species in non-aqueous environments. All the $CO_2$-amine adducts decarboxylate on heating, liberating $CO_2$ and regenerating the amine. For example, in the case of aqueous MEA, decarboxylation is typically carried out at 120° C. at 0.2 MPa, which has significant energy implications for the overall process.

In addition to amines, a range of other organic molecules can reversibly capture $CO_2$, often when they are converted into basic salts, or if they have inherent basicity themselves. The most appropriate method for determining the suitability of a molecule for $CO_2$ capture is based on its pKa—that is, the acidity of the conjugate acid.

$pK_a$ is defined as the $-\log$ of $K_a$, the acid dissociation constant, and is derived from the following equations:

For: $HA \rightleftharpoons H^+ + A^-$ $K_a = \dfrac{[H^+][A^-]}{[AH]}$ $pK_a = -\log K_a$ where HA represents the acid species and the quantities in square brackets are concentrations. Values quoted are usually measured in water (hence $H^+$ is usually present as the hydronium ion, $H_3O^+$), unless otherwise stated, but can be very solvent dependent (vide infra).

Other than simple primary amines, most solvents for $CO_2$ capture operate via the bicarbonate salt route, where $CO_2$ is hydrated by water, facilitated by the basic solvent. The effective pKa of $CO_2$ in water is 6.3, which arises from a combination of the various equilibria when $CO_2$ is dissolved in water:

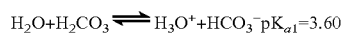
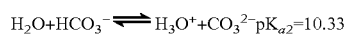

Thus, suitable bases need to have a pKa significantly higher than this in water, and usually the value should be in the range of 8-12. In aqueous systems pH also plays a major role in determining active species in solution and the effectiveness of the capture and release process. Again, an alkaline pH of 10-13 is usually required for efficient absorption, and is usually controlled by the addition of base (e.g. hydroxide or amines) to the solution. As these solutions absorb $CO_2$, the pH decreases as neutralisation of the base takes place. Heating the $CO_2$ loaded solution liberates $CO_2$ and regenerates the basic solution for re-use. Alternatively, significantly lowering the pH of the solution (e.g. by the addition of acid) also induces rapid decarboxylation via protonation of bicarbonate to form carbonic acid, which undergoes rapid conversion back to $CO_2$ and water.

Acid gas capture is a very active field of research and extensive work is underway using bases, typically amines, which react with $CO_2$, and which is then liberated on heating to regenerate the original solvent. Whilst there are many different variations on this theme, almost all of the prior art uses the thermal approach for decarboxylation and solvent regeneration.

Recent studies using alcohols (or thiols) and appropriate bases shows considerable promise, but require anhydrous conditions, which is a major limitation for typical flue gas streams.[15] Related disclosures include WO-A-2008/068411, which teaches the use of an amidine or guanidine base and a hydroxyl or thiol, and U.S. Pat. No. 7,799,299, which discloses acid gas binding organic liquid systems ($CO_2$-BOLS) that permit separation of one or more acid gases, again based on amidines and guanidines reacting with weak acids, such as alcohols and thiols, in the presence of acid gases. WO-A-2012/031281 teaches related chemistry where a nitrogenous base reacts to form a carbamate salt or heteroatom analogue, without any substantial formation of a carbonate ester or heteroatom analogue.

Amongst other approaches to the capture of $CO_2$, US-A-2006/0154807 discusses a boronic acid-derived structure comprising a covalently linked organic network including a plurality of boron-containing clusters linked together by a plurality of linking groups which may be used to adsorb carbon dioxide. Similarly, WO-A-2008/091976 relates to the use of materials that comprise crystalline organic frameworks, including boronic acid derived-structures, which are useful for the storage of gas molecules, such as $CO_2$. GB-A-1330604, on the other hand, is concerned with the separation of carbon dioxide from a gas stream by scrubbing with an aqueous solution of orthoboric acid and potassium hydroxide at 70° to 160° C. at a pressure from 1 to 30 atmospheres.

US-A-2005/0129598 teaches a process for separating $CO_2$ from a gaseous stream by means of an ionic liquid comprising an anion having a carboxylate function, which is used to selectively complex the $CO_2$. The ionic liquid, which is effectively a low melting molten salt made up entirely of ions, can subsequently be readily regenerated and recycled.

GB-A-391786 discloses a process for the separation of carbon dioxide by means of aqueous solutions containing alkalis in chemical combination with sulphonic or carboxylic organic acids, including amino-sulphonic acids, amino acids such as alanine and asparagines, mixtures of amino acids obtained by the degradation of albumens, weak aliphatic mono- and di-carboxylic acids, and imino acids such as imino di-propionic acid. The hydroxides and oxides of sodium, potassium, lithium, or salts of these metals such as the carbonates, are preferably used as the bases.

U.S. Pat. No. 1,934,472 teaches a method for the removal of carbon dioxide from flue gases which involves treating the gas mixture with a solution of sodium carbonate or triethanolamine carbonate, and subsequently liberating the carbon dioxide by heating the resulting liquid under reduced pressure.

U.S. Pat. No. 1,964,808 recites a method for the removal of carbon dioxide from gaseous mixtures which involves treating the mixtures with a solution of an amine borate and subsequently liberating the carbon dioxide by heating the resulting liquid.

U.S. Pat. No. 1,990,217 discloses a method for the removal of hydrogen sulphide from gaseous mixtures which involves treating the mixtures with solutions of strong inorganic bases, such as alkali metal or alkaline earth compounds, with organic acids containing carboxylic or sulphonic acid groups and, if desired, liberating the hydrogen sulphide by heating.

U.S. Pat. No. 2,031,632 is concerned with the removal of acidic gases from gaseous mixtures by treating the mixtures with solutions of basic organic amino compounds, such as ethanolamines, in the presence arsenic or vanadium compounds, and the liberation of the acidic gases by heating.

GB-A-786669 relates to the separation of carbon dioxide or hydrogen sulphide from a gaseous mixture by a process using an alkaline solution containing an amino acid or protein under pressure and at elevated temperature, whilst GB-A-798856 discloses the separation of carbon dioxide from a gaseous mixture by means of an alkaline solution containing an organic or inorganic compound of arsenic, in particular arsenious oxide as such, or as arsenite. In each case, regeneration may be effected by passing hot air or steam through the solution, and the alkaline solution may contain sodium, potassium or ammonium carbonate, phosphate, borate, arsenite or phenate or an ethanolamine, whilst boric acid, silicic acid, and salts of zinc, selenium, tellurium and aluminium act as synergistic agents for the arsenious oxide.

Similarly, GB-A-1501195 relies on a process using an aqueous solution of an alkali metal carbonate and an amino acid, for the removal of $CO_2$ and/or $H_2S$ from gaseous mixtures, the improvement on this occasion involving the addition of compounds of arsenic and/or vanadium to the absorbing solution as corrosion inhibitors. Again, regeneration of the gases is subsequently effected.

U.S. Pat. No. 2,840,450 teaches the removal of carbon dioxide from gaseous mixtures by a method which involves treating the mixtures with an alkaline solution of an aliphatic amino alcohol, carbonate, phosphate, borate, monovalent phenolate or polyvalent phenolate of sodium, potassium or ammonia in the presence of selenious acid or tellurous acid or their alkali metal salts, and subsequently liberating the carbon dioxide by heating the resulting liquid.

U.S. Pat. No. 3,037,844 recites a method for the removal of carbon dioxide from gaseous mixtures which involves treating the mixtures with an aqueous solution of a carbonate, phosphate, borate, or phenolate of an alkali metal or ammonia in the presence of arsenious anhydride, and subsequently liberating the carbon dioxide.

GB-A-1091261 is concerned with a process for the separation of $CO_2$ and/or $H_2S$ from gaseous mixtures which requires passing the mixture through an absorbent liquor comprising an aqueous solution of an alkali metal salt of a weak acid, such as potassium carbonate or tripotassium phosphate, and then passing the liquor containing dissolved acidic gases into a regenerator where the liquor is heated and stripped with steam to liberate the acidic gases.

U.S. Pat. No. 4,217,238 relates to the removal of acidic components from gaseous mixtures by contacting aqueous solutions comprising a basic salt and an activator for the basic salt comprising at least one sterically hindered amine and an amino acid which is a cosolvent for the sterically hindered amine.

U.S. Pat. No. 4,440,731 teaches corrosion inhibiting compositions for use in aqueous absorbent gas-liquid contacting processes for recovering carbon dioxide from flue gases, the method employing copper carbonate in combination with one or more of dihydroxyethylglycine, alkali metal permanganate, alkali metal thiocyanate, nickel or bismuth oxides with or without an alkali metal carbonate.

Likewise, U.S. Pat. No. 4,446,119 is concerned with a corrosion inhibiting composition for the separation of acid gases such as carbon dioxide from hydrocarbon feed streams which, on this occasion, contains a solution of e.g. an alkanolamine with water or organic solvents and small amounts of soluble thiocyanate compounds or soluble trivalent bismuth compounds, with or without soluble divalent nickel or cobalt compounds.

CN-A-102764566 describes the use of a 1,2,4-triazole salt with imidazolium or tetrazole salts for capture of acid gases, including $CO_2$, in water or a range of other solvents, whilst WO-A-2009/066754 reports the use of imidazoles in combination with amines for the capture of $CO_2$.

U.S. Pat. No. 4,624,838 discloses a process for removing acid gases using either a 5 or 6-membered heterocyclic ring having a pKa of no greater than about 8, with imidazole as the preferred heterocyclic nitrogen compound, and U.S. Pat. No. 4,775,519 discloses a mixture of N-methyldiethanolamine with imidazole or a methyl substituted imidazole to capture $CO_2$.

Triazole salts alone have also been reported for use in non-aqueous systems (particularly DMSO), which overcomes some of the solubility issues.[17] In this case, it is reported that $CO_2$ capture occurs by direct reaction of triazolate with $CO_2$ forming a new covalent N—C bond; this is a different mechanism to that likely to operate under aqueous conditions, where capture most probably occurs via bicarbonate formation. Ionic liquid triazole salts have also been disclosed as $CO_2$ capture agents.[18]

Guanazole has been used as a ligand for catalysts for electrochemical reduction of $CO_2$,[19] and in metal-organic frameworks (MOFs) which have potential as solid absorbents for $CO_2$ capture, but these materials have very different mechanisms by which they operate and methods of commercial implementation.[20]

In WO-A-2011/135378 there is disclosed a method for the capture of carbon dioxide gas which comprises contacting the carbon dioxide with a composition comprising at least two compounds selected from basic compounds, at least one of which is an organic compound and at least one of which is an inorganic salt. Typically, the basic organic compounds may comprise amino compounds, or salts obtained by treatment of weakly acidic organic compounds with bases.

Further alternative methods for $CO_2$ separation have been reviewed, and a comparison of these suggests that membrane diffusion is potentially the most powerful method but requires suitable membrane materials to be developed.[16]

It is apparent, therefore, that thermal liberation of $CO_2$ and solvent regeneration is the main approach used in the prior art acid-base capture processes. In some cases, the temperatures required can be substantially less than for conventional amines, but the processes still require major energy input or have otherwise limiting aspects to their technology. Alternative methods for liberating $CO_2$ and regenerating solvent are very limited.

A notable exception, however, is disclosed in WO-A-2006/082436, which relates to a gas separation device for separating a reactive gas—such as $CO_2$—from a gaseous mixture, the device comprising porous anode and cathode electrodes separated by an ionic membrane, the anode being impregnated with an absorbent compound or solvent, whilst the cathode is impregnated with an electrically conductive liquid. Amongst suitable absorbent compounds for this purpose are amines, sulphonic acids and carboxylic acids. Absorption, desorption or both are promoted by application of electric charge to the electrodes. A recent study disclosed by M. C. Stern, F. Simeon, H. Herzog and T. A. Hatton, Energy Environ. Sci., 2013, 6, 2505, also describes electrochemically mediated amine regeneration by reduction of metal cations which otherwise react with amines and displace $CO_2$.

Nevertheless, it is clear that current methods for capture of $CO_2$ and other acid gases are expensive and far from ideal for large scale application, so the present invention attempts to address this problem by providing a solution which is relatively simple, and uses inexpensive processes and consumables. The process of the present invention seeks to provide lower energy requirements for decarboxylation and can operate at much lower temperatures (preferably ambient temperature), which minimises atmospheric emissions and degradation. These aspects are an increasing concern with amine-based systems, as is becoming more apparent in the light of recent pilot studies, particularly with regard to large scale implementation in areas such as power stations, cement and steel manufacture, brewing, and large scale chemical processes such as ammonia production.

The capture systems envisaged by the present invention would also be suitable for use in smaller scale specialist applications, such as in submarines, spacecraft and other enclosed environments. Furthermore, in view of the potentially dramatic increase in efficiency of the process of the invention when compared with conventional processes, the technology also has potential application to the capture of $CO_2$ directly from the atmosphere. The use of the technology for the capture of other acid gases (e.g. $H_2S$ and $SO_2$) or mixtures thereof is also envisaged, in applications such as natural gas sweetening and desulphurisation.

Whilst it is known that manipulation of the acidity (pKa) of acids and bases can be achieved by variation of solvent composition, it is surprising that this can be adapted in order to provide a highly efficient process for $CO_2$ capture and release, wherein variation of solvent composition provides the required transformation in conditions between capture and release operation (for example, by switching the relative pKa of bicarbonate and a capture agent), rather than requiring the thermally driven processes of the prior art. Such a process can also be used in conjunction with other mechanisms, such as thermal release, but under much milder and more controlled conditions than previously required. In an alternative embodiment, the solvent composition can be controlled so as to optimise the acid base equilibrium in a capture and release process, such that non-conventional capture agents can be used and the solvent composition can be optimised to minimise the energy input requirements in the capture/release cycle.

SUMMARY OF THE INVENTION

The present invention derives from an appreciation on the part of the inventors that the pKa value of a given compound, which is a function of the stability of its conjugate base, can be significantly influenced by solvent effects, such that the same acid can have significantly different $pK_a$ values in different solvents or solvent combinations. The extent of this dependence varies with structural features, such as intramolecular hydrogen-bonding, nearby charge stabilising functional groups or charge delocalisation, which help the dissipation of the negative charge of the conjugate base.

Thus, anions which lack structurally inherent stability are forced to rely on the polarity and hydrogen-bond donating ability of the solvent, making their $pK_a$ value more substantially solvent dependent. Consequently, it is found that a range of compounds which would generally be considered to be unsuitable for $CO_2$ capture purposes due to their low basicity may be used for such purposes if their pKa relative to that of $CO_2$ changes significantly in a particular solvent system.

The basicity of the species formed by deprotonation of an acid is closely related to its ability to capture $CO_2$ so that, if basicity can be controlled by solvent, reactivity towards $CO_2$ can also be controlled if there is a significant change in basicity relative to that of $CO_2$. The key feature demonstrated by the inventors is that the effective $pK_a$ of $CO_2$ (and other acid gases) can be varied relative to the conjugate acids of the capture agents by changing the solvent composition. This allows for the manipulation of $pK_a$ values so as to control the capture and release of $CO_2$ (or other acid gases), facilitating the tuning of a system to minimise energy requirements and permit working at low temperatures, thereby minimising solvent degradation and environmental emissions.

Thus, a capture process would be envisaged wherein the capturing acid requires a relatively high $pK_a$ (higher than that for $CO_2$) such that the salt of the acid will capture $CO_2$ and reform the acid and, most probably, a bicarbonate salt. This would be achieved most effectively in a solvent which increases the $pK_a$ of the acid (and thereby the strength of the conjugate base) relative to $CO_2$. In order to promote the release process, the $pK_a$ of the acid would then need to be lowered such that it had a comparable or higher acidity than the bicarbonate, so as to facilitate decarboxylation via a conventional acid mediated process (vide supra).

In mixed solvents the effective $pK_a$ of an acid lies between the $pK_a$ values measured in the individual solvents and is approximately proportional to the composition of the mixture. As a consequence, changing the composition of the solvent by adding or removing one component can, in certain cases, bring about a shift in acid strength of several orders of magnitude. Importantly, it can also change the relative acidity of acids present in a solution, as not all acids are affected to the same degree, due to the varying nature of solvation and its importance in anion stabilisation.

This phenomenon may be illustrated by reference to a specific example. Thus, it is known that the pKa of acetic acid varies widely when it is combined with a solvent, and the pKa value is variation depends on the nature and composition of the solvent, as illustrated in Table 1, which shows the values observed in pure solvents; intermediate values may be obtained by the use of appropriate solvent mixtures.

TABLE 1

Variation of pKa of Acetic Acid with Solvent

| Entry | Solvent | $pK_a$ Value |
|---|---|---|
| 1 | Water | 4.76 |
| 2 | MeOH | 9.7 |
| 3 | EtOH | 10.3 |
| 4 | DMSO | 12.3 |
| 5 | DMF | 13.3 |
| 6 | t-BuOH | 14.2 |
| 7 | 1,2-Dichloroethane | 15.5 |
| 8 | MeCN | 23.51 |

The present application is concerned with the application of such a solvent manipulation approach to the capture and release of $CO_2$ and other acid gases, thereby alleviating the energy penalty associated with thermal processes. In fact, it is found that the method of the present application can operate at much lower temperatures (preferably ambient temperature), thereby minimising atmospheric emissions and degradation.

In principle bicarbonates (and $CO_2$) will change $pK_a$ values on changing solvent compositions but, surprisingly, this does not occur to the same degree as, for example, with structurally related carboxylates, and relative $pK_a$ changes allows facile carboxylation and decarboxylation by simply changing solvent composition. Typically, the capturing agents which are employed in the method of the present invention have $pK_a$ values in the capturing compositions which generally fall in the range of from 10-13.5.

Thus, according to a first aspect of the present invention, there is provided a method for the capture of at least one acid gas in a composition, the release of said gas from said composition, and the subsequent regeneration of said composition for re-use, said method comprising performing, in order, the steps of:
(a) capturing the at least one acid gas by contacting said at least one gas with a capture composition comprising at least one salt of a carboxylic acid and at least one water-miscible non-aqueous solvent;
(b) releasing said at least one acid gas by adding at least one protic solvent or agent to said composition; and
(c) regenerating the capture composition by partial or complete removal of said added protic solvent or agent from said composition.

In typical embodiments of the invention, said composition comprising at least one salt of a carboxylic acid and at least one water-miscible non-aqueous solvent additionally comprises water or another protic solvent or agent; said additional solvent may be present at levels of up to 80% w/w, but is generally present in more limited quantities of around 1-50% w/w (relative to the non-aqueous solvent), more typically 1-20% w/w, and most typically at levels of 5-10% v/v.

Said at least one salt of a carboxylic acid is typically a metal, ammonium, phosphonium or sulphonium salt and may conveniently be a salt of an alkali metal such as lithium, sodium or potassium, an alkylammonium or aralkylammonium salt, for example a triethylammonium, tetamethylammonium, tetrabutylammonium, benzyltrimethylammonium or choline salt, a guanidine salt or a zwitterionic species, or mixtures of the above. A particularly suitable moiety is found to be 1,8-Diazabicyclo[5.4.0]undec-7-ene.

Salts of carboxylic acids are typically formed from the corresponding carboxylic acid and a base and, in order to have significant $CO_2$ capture activity, must be present as the predominant species. If weak bases are used, then residual acid will limit the capture efficiency. Most simple carboxylic acids are suitable for use in this process, unless they have additional structural features which limit solvent induced pKa changes, such as the ability to form intramolecular hydrogen bonds (thereby reducing the impact of solvation on anion stabilisation), in which case significantly lower capture capacities and solvent induced release would be expected.

Salts of aliphatic or aromatic carboxylic acids may be used for the purposes of the invention. Suitable aliphatic carboxylic acids may be selected from straight chained, branched or cyclic carboxylic acids which may be substituted or unsubstituted by substituent groups or by aromatic or heteroaromatic ring systems. Polycarboxylic acids, such as di-, tri- and tetra-carboxylic acids are also suitable, as are polymeric acids such as polyacrylic acid and polymethacrylic acid, and polymeric carboxylic acids such as naturally derived carboxylic acid-containing biopolymers, including alginic acid (from seaweed) and pectin (from plant cell walls). Salts of simple aromatic carboxylic acids such as benzoic acid are also suitable for the purposes of the invention, as are zwitterionic carboxylate salts, including betaine ($Me_3N^+CH_2CO_2^-$) and associated homologues. Such salts may be in solution, slurry, or dispersion.

Typically, said salts are salts of $C_{1-20}$ aliphatic carboxylic acids, more typically salts of $C_{1-8}$ aliphatic carboxylic acids, such as acetic acid, propionic acid, butyric acid, isovaleric acid or pivalic acid. Said aliphatic chains may be straight-chain or branched.

Said at least one water-miscible non-aqueous solvent may be selected from all available at least partially water-miscible, optionally completely water-miscible, nonaqueous solvents, but typically comprises at least one polar solvent, which is most typically aprotic. Particularly suitable solvents may include, for example, dimethylsulphoxide (DMSO), N-methylpyrrolidinone (NMP), dimethylformamide (DMF), tetrahydrofuran (THF), 2-methyltetrahydrofuran, acetonitrile, sulfolane, 1,1,3,3-tetramethylurea (TMU), N,N'-dimethyl-N,N'-trimethyleneurea (1,3-dimethyl-3,4,5,6-tetrahydro-2-pyrimidinone (DMPU)), 1,3-dimethyl-2-imidazolidinone (DMI), 1,4-dioxane, 1,3-dioxolane, lactate esters such as ethyl lactate, or polyethers, for example glycol ethers, including (poly)alkyleneglycol (poly)alkylethers such as propylene glycol dimethyl ether (Proglyde®) or diethylene glycol diethyl ether. In some embodiments, the water miscibility of certain solvents may only be partial, but such solvents have particular benefits in developing processing routes which employ aqueous-organic phase separation for solvent regeneration (vide infra).

Other suitable solvents may include acetone, anisole, benzene, benzonitrile, benzyl alcohol, 1-butanol, 2-butanol, tert-butanol, 2-butoxyethanol, 2-butoxyethyl acetate, 2-(2-butoxyethoxy)ethyl acetate, butyl acetate, iso-butyl acetate, tert-butyl acetoacetate, butyl ether, tert-butyl methyl ether, carbon disulphide, chlorobenzene, 1-chlorobutane, chloroform, cumene, cyclohexane, cyclohexanone, cyclopentane, decahydronaphthalene, decane, 1,2-dichlorobenzene, 1,2-dichloroethane, 1,1-dichloroethene, 1,2-dichloroethane, diethoxy ethane, N,N-diisopropylethylamine, 1,2-dimethoxyethane, N,N-dimethylacetamide, dodecane, ethanol, 2-ethoxyethanol, ethyl acetate, ethylbenzene, ethyl ether, ethyl-3-ethoxypropionate, ethyl formate, ethylene glycol, ethylene glycol diethyl ether, 2-ethyl-1-hexanol, 2-ethylhexyl acetate, formamide, glycerol, heptane, 1-heptanol, 2-heptanone, hexadecane, hexane, 1-hexanol, 2-hexanol, 2-methoxyethanol, 2-methoxyethyl acetate, 1-methoxy-2-propanol, methyl acetate, 3-methyl-1-butanol, methyl butyl ketone, methyl iso-butyl ketone, methylcyclohexane, methylene chloride, methyl ethyl ketone, methyl formate, 5-methyl-2-hexanone, 4-methyl-2-pentanol, 2-methyl-1-propanol, nitrobenzene, nitromethane, nonane, 1-octanol, pentachloroethane, pentane, 1-pentanol, 2-pentanol, 3-pentanol, 2-pentanone, 3-pentanone, iso-pentyl acetate, petroleum ether, polyethers, including glycol ethers, for example (poly)alkyleneglycol (poly)alkylethers such as diethylene glycol dimethyl ether (diglyme), diethylene glycol monobutyl ether, diethylene glycol monoethyl ether, diethylene glycol monomethyl ether, diethylene glycol monopropyl ether, dipropylene glycol dimethyl ether, ethylene glycol dimethyl ether, ethylene glycol monobutyl ether, ethylene glycol monoethyl ether, ethylene glycol monomethyl ether, ethylene glycol monopropyl ether, propylene glycol monobutyl ether and triethylene glycol dimethyl ether, 1-propanol, 2-propanol, propionaldehyde, 2-propoxyethanol, propyl acetate, iso-propyl acetate, iso-propyl ether, pyridine, 1,1,2,2-tetrachloroethane, tetrachloroethylene, tetralin, toluene, 1,2,4-trichlorobenzene, 1,1,1-trichloroethane, trichloroethylene, triethyl orthoformate, 3,5,5-trimethyl-1-hexanol, 2,2,4-trimethylpentane or xylene.

Said at least one salt of a carboxylic acid is typically initially present in said composition at a level of between 1M and 14M relative to the initial solvent composition, most typically in the range of from 2M to 6M, or optionally 2M to 5M. As previously noted, low levels of water or other protic solvents may also be present in the composition, typically at a level of 1-20% v/v; specifically in the case when the capture process involves the formation of bicarbonate ($CO_2$ capture), it is required that at least one mole of water should be present for every mole of $CO_2$ which is captured.

Said at least one protic solvent or agent may be selected from all available protic solvents and may include any highly polar solvent including, for example, water or an alcoholic solvent, typically an aliphatic alcohol such as methanol, ethanol, glycerol, ethylene glycol (including polymers and oligomers thereof), trifluoroethanol or dihydroxymethane. In this context, a highly polar solvent may be taken as a solvent which typically has a dipole moment greater than 0.5 Debye. Other suitable solvents or agents for inducing release of $CO_2$ include hydroxyl containing compounds, for example sugars such as glucose and fructose, oligosaccharides such as cotton, starch and alginic acid, and amino acids such as serine, and related oligomers.

Said at least one protic solvent or agent is added in an amount which is sufficient to promote release of said captured gas. Embodiments of the invention envisage addition of the solvent at a level of from 5-50% v/v, more typically in an amount of from 20-30% v/v.

Optionally, said composition for capturing said at least one acid gas may additionally comprise at least one accelerant, which is capable of increasing the rate of $CO_2$ uptake into the composition. Suitable accelerants may, for example, be selected from aliphatic or alicyclic amino derivatives, including primary, secondary or tertiary amines. Suitable aliphatic or alicyclic amino compounds may, for example, be selected from aliphatic amines such as tetramethylethylenediamine (TMEDA), tetraethylmethanediamine (TEMDA), tetramethylmethanediamine (TMMDA), tetramethyl-1,3-diaminopropane (TMPDA) or triethylamine (TEA), hydroxyl-substituted aliphatic or alicyclic amino compounds, such as monoethanolamine (MEA), diethanolamine (DEA), N-methyldiethanolamine (MDEA), 2-diethylaminoethanol (DEAE), 3-(diethylamino)-1,2-propanediol (DAPD) or 2-amino-2-methyl propan-1-ol (AMP), alicyclic amines such as piperazine (PZ), morpholine, piperidine, pyrrolidine or 1,8-diazabicyclo[5.4.0]undec-7-ene (DBU), or amino acids, for example glycine or related compounds.

Typically, said at least one acid gas comprises carbon dioxide gas which may, for example, be comprised in a carbon dioxide-containing waste stream. Other acid gases may typically include sulphurous gases, such as hydrogen sulphide or sulphur dioxide.

Said composition is in a liquid form, and may optionally comprise, for example, a slurry, a dispersion or a suspension. Typically, however, said composition comprises a solution which generally has a total concentration of at least 1 mol/L (1M). Typically, contacting the at least one acid gas with said composition may conveniently be achieved by passing an acid gas-containing waste stream through said composition, most conveniently in solution form.

The method of the invention is typically applied to the capture and release of $CO_2$ and is most conveniently carried out by initially contacting the gas, typically $CO_2$, with the composition in aqueous solution at temperatures in the region of the ambient, typically in the range of from 10° C. to 50° C., optionally 10° C. to 40° C. These are the initial temperatures of contact, and the temperature may subsequently rise as a consequence of the exothermicity of the capture reaction.

Gas capture may be achieved at pressures in the range of from 1 to 50 bar. In specific embodiments, capture of gas may typically be achieved at pressures of around 1 bar; in alternative embodiments using pressurised systems, capture of gas typically occurs at pressures in the range of from 10 to 30 bar, most typically around 20 bar.

Release of the gas typically occurs at temperatures which are in the range of from 10° C. to 80° C., most typically nearer the ambient, generally in the region of from 25° C. to 60° C., optionally 25° C. to 40° C.

Release of the gas is conveniently achieved at pressures in the range of from 1 to 150 bar. In specific embodiments, release of gas may typically be achieved at pressures of around 1-2.5 bar; in alternative embodiments using pressurised systems, release of gas typically occurs at pressures in the range of from 5 to 30 bar, most typically around 20 bar.

A particularly useful aspect of the technology is that the release process will generate $CO_2$ or other released gases in enclosed and/or pressurised systems which will allow for increased pressure, and this should reduce further compression requirements for storage applications, with important implications for reductions in overall energy consumption for the complete capture and storage process.

Release of the captured gas from the composition facilitates regeneration of the composition, such that it may be used for further capture and release operations with further acid gases and this regeneration process typically requires separation of the releasing additive—the protic solvent or agent—from the original composition.

Thus, the invention includes the step of regenerating the original capture composition comprising at least one salt of a carboxylic acid and at least one water-miscible non-aqueous solvent by separation of some or all of the at least one protic solvent or agent responsible for inducing acid gas release from the composition remaining after release of the captured acid gas. Removal of the at least one protic solvent or agent may conveniently be achieved by means of any one of a number of methods which are well known to those skilled in the art including, for example, separation by means of membranes, which may include conventional membrane processes or the application of techniques such as pervaporation, mechanical vapour recompression (MVR) or reverse osmosis, distillation techniques, adsorption using hydrophilic or hydrophobic materials, flashing processes under negative pressure, thermal regeneration, solvent stripping, the application of vacuum or pressure, mechanical regeneration, or phase separation. Typically, said phase separation causes the formation of two discrete liquids. Suitable membrane separation processes may utilise either hydrophilic membrane materials, such as silica, or hydrophobic membrane materials, an example of which is PTFE.

As previously observed, embodiments of the invention envisage compositions comprising at least one salt of a carboxylic acid and at least one water-miscible non-aqueous solvent which additionally comprise water or another protic solvent or agent, wherein said additional solvent is more typically present in limited quantities of around 1-30% v/v (relative to the total solvent volume), and more typically at levels of 10-20% v/v.

Thus, according to a further aspect of the present invention, there is provided a method for the capture of at least one acid gas in a composition, the release of said gas from said composition, and the subsequent regeneration of said composition for re-use, said method comprising performing, in order, the steps of:
  (a) capturing the at least one acid gas by contacting said at least one gas with a capture composition comprising at least one salt of a carboxylic acid, at least one non-aqueous solvent and at least one protic solvent or agent;
  (b) releasing said at least one acid gas by subjecting said composition to the application of heat or stripping with a stream of air; and
  (c) regenerating the capture composition by cooling.

Optionally, in certain embodiments, said method may also include the step of partial or complete removal of said protic solvent or agent from said composition.

According to this aspect of the invention, said protic solvent is typically water and said protic solvent or agent is generally present at levels of 5-20% v/v.

This aspect of the invention does not envisage the further addition of at least one protic solvent or agent to the composition in an additional process step but, rather, achieves release of the captured at least one acid gas solely by the application of heat or a stream of air. Typically, release of gas may be achieved by heating to temperatures in the region of 30-80° C., more typically 40-60° C., or by air stream stripping at temperatures of 30-50° C., typically around 40° C.

The methods of the invention are simple and economic to implement, and provides a major improvement over the methods of the prior art in terms of capture efficiency and energy requirements whilst significantly improving on the environmental profile by using less hazardous reagents, generally at ambient temperature, thereby greatly reducing emissions and degradation issues.

BRIEF DESCRIPTION OF THE DRAWINGS

Embodiments of the invention are further described hereinafter with reference to the accompanying drawings, in which.

DESCRIPTION OF THE INVENTION

Figure 1:
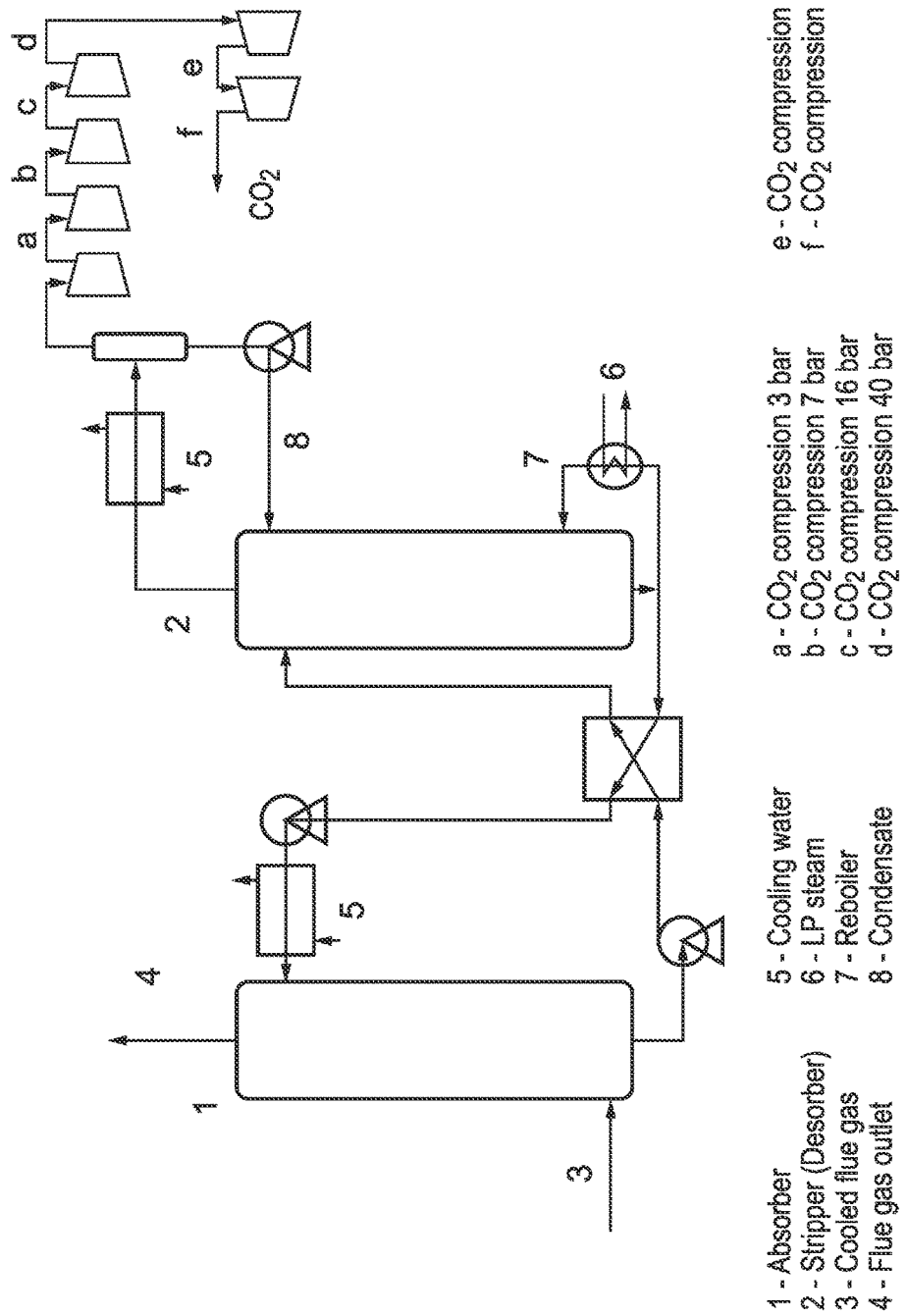
FIG. 1 shows a schematic representation of a conventional post-combustion capture process.

The present inventors have provided a new system of acid gas capture compositions that provides significant advantages over the methods of the prior art and finds potential application in areas such as power stations, cement manufacture, steel manufacture, glass making, brewing, syngas processes, natural gas and biogas purification and other chemical processes, such as ammonia production, as well as any other acid gas producing industrial processes. In a particular application, the defined method may be applied to the capture of carbon dioxide from the atmosphere.

As well as such applications, the compositions provided by the present invention are also appropriate for use in smaller scale specialist applications such as, for example, in submarines, spacecraft and other enclosed environments.

A particular embodiment of the invention envisages the application of the disclosed method to the capture and subsequent release of carbon dioxide. The incorporation of carbon dioxide into a substrate is known as carboxylation; the removal of the same group is decarboxylation. This carboxylation/decarboxylation process is key to effective $CO_2$ capture and absorbent regeneration.

The present invention also envisages the use of the disclosed formulations in the capture and subsequent release of other acid gases (e.g. $H_2S$, $SO_2$) or mixtures thereof, in applications such as natural gas sweetening and desulphurisation.

In specific embodiments of the invention, systems are provided wherein $CO_2$ gas is captured by the use of formulations which comprise potassium or tetrabutylammonium salts of acetic, propionic or butyric acid in solvent systems comprising water in combination with, for example, dimethylsulphoxide or N-methylpyrrolidinone. The use of such systems facilitates the highly efficient capture of the gas at ambient temperature and pressure. Subsequent release of the captured gas may conveniently be achieved by the addition of further water to the gas-loaded compositions.

Thus, the inventors have conducted a range of trials utilising equipment adapted for the measurement of vapour-liquid equilibria (VLE). Specifically a system was provided which comprised a stainless steel vessel (~400 mL) equipped with a pressure transducer, two temperature probes (one for monitoring vapour temperature, one for solvent temperature), a safety release valve, and an assembly for purging/refilling the chamber with a known atmosphere.

From the data collected for a given formulation, it was possible to directly determine the rate of $CO_2$ absorption, the proportion of $CO_2$ recoverable depending on solvent composition, and the $CO_2$ absorption/desorption profile at different partial pressures of $CO_2$.

By the use of a spray nozzle and syringe assembly, it was also possible to determine the rate of $CO_2$ uptake by a given formulation with mass transfer effects minimised so as to provide an insight into the mechanism of $CO_2$ absorption by solvents.

In order to demonstrate the highly effective nature of the systems of the invention, various aliphatic carboxylate salts were studied, together with alternative organic acid salts, specifically salts of aromatic compounds, in particular phenolate salts and salts of an aromatic carboxylic acid, salicylic acid.

The salts were dissolved in mixtures of dimethylsulphoxide (DMSO) and water; suitable ratios were found to be between 1000:1 and 1:1 and particularly favourable results were demonstrated by the aliphatic carboxylate salts at a DMSO:water ratio of 3:1. In water alone, it was demonstrated that the carboxylate salts do not capture $CO_2$, as the $pK_a$ of a carboxylic acid is too low ($pK_a$=5); a phenolate does, however, capture $CO_2$ in these circumstances as, in water, this salt has a much higher $pK_a$ (10). In a mixture of DMSO and water (3:1), however, both capture agents would have significantly higher $pK_a$ and so would be expected to show improved $CO_2$ capture efficiency.

Each solution under test was exposed to $CO_2$ at ambient pressure and the absorption process was allowed to reach equilibrium. The results which were obtained are presented in Table 2.

Thus, it was observed that, in DMSO and water (3:1), salts of carboxylic acids (e.g. 1M Na-acetate, K-propionate and K-butyrate, entries 1, 2 and 3) captured significant amounts of $CO_2$ (up to 0.63 $mol_{CO2}$/L) clearly demonstrating the enhanced basicity of the carboxylate under these conditions; by way of comparison, the $pK_a$ of acetic acid is 12.4 in pure DMSO. The phenolate salt also showed high $CO_2$ capture (entry 4), as would be expected due to increased $pK_a$ (the $pK_a$ of phenol in pure DMSO is 18).

TABLE 2

VLE Performance of Carboxylate and Phenolate Salts in Mixed Aqueous-Organic Solvents

| Entry | Salt[a] | Solvent | Fast Rate (1/s) | Full Capacity ($mol_{CO2}$/L) | Recovered $CO_2$ (%)[b] |
|---|---|---|---|---|---|
| 1 | Na-acetate | DMSO:$H_2O$ 3:1 | 0.017 | 0.29 | 65 |
| 2 | K-propionate | DMSO:$H_2O$ 3:1 | 0.018 | 0.50 | 93 |
| 3 | K-butyrate | DMSO:$H_2O$ 3:1 | 0.010 | 0.63 | 78 |
| 4 | K-phenolate | DMSO:$H_2O$ 3:1 | 0.009 | 0.89 | — |
| 5 | K-propionate[c] | NMP:$H_2O$ 3:1 | 0.005 | 0.92 | 88 |
| 6 | K-butyrate | DMSO:$H_2O$ 3:1 | 0.008 | 0.56 | 2[d] |
| 7 | K-butyrate | DMSO:$H_2O$ 3:1 | 0.008 | 0.56 | 19[e] |
| 8 | K-butyrate | DMSO:$H_2O$ 3:1 | 0.008 | 0.56 | 93 |
| 9 | K-butyrate | NMP:$H_2O$ 5.3:1 | 0.006 | 0.71 | 66[f] |
| 10 | TBA[g] butyrate | NMP (1M $H_2O$) | 0.074 | 0.56 | 88[h] |
| 11 | DBU-isovalerate | NMP:$H_2O$ 9:1 | 0.010 | 1.15 | 74 |
| 12 | DBU-isovalerate | Sulfolane:$H_2O$ 9:1 | 0.030 | 1.05 | 73 |

[a] 1M solution;
[b] upon increasing $H_2O$ content to 1:1 (5 mL added);
[c] 2M solution;
[d] EtOH content to 3:1 (5 mL);
[e] MeOH content to 3:1 (5 mL);
[f] MeOH content to 1:1 (10 mL);
[g] TBA = tetrabutylammonium;
[h] Upon increasing $H_2O$ content to 2:1 (5 mL added)

Following capture of the $CO_2$, water was added to the composition at ambient temperature in order to increase the ratio of water in the solvent mixtures to 1:1 so as to induce $CO_2$ release by lowering the $pK_a$ of the acids formed on carboxylation. The amount of $CO_2$ recovered was then determined.

The procedure was shown to be successful for a range of aliphatic carboxylic acid salts (e.g. potassium propionate, sodium acetate and potassium butyrate), all of which efficiently captured $CO_2$ and released up to 93% of the absorbed $CO_2$ simply upon water addition at ambient temperature.

It was significant, however, that no $CO_2$ was liberated from the composition comprising the phenolate using this process, as the $pK_a$ was still too high to allow the gas to be liberated at room temperature, even in 100% water (entry 4). This provides further evidence that it is the $pK_a$ value that is of key significance in the decarboxylation process.

The use of higher concentrations of carboxylic acid salts (2M potassium propionate, entry 5) showed almost a doubling of capacity, with a negligible decrease in recovered $CO_2$ liberated on addition of water (93 to 88%).

Although water appears to be the optimum solvent for addition to facilitate $CO_2$ liberation, other protic solvents, most particularly methanol, were also found to be successful in achieving this objective (entries 7 and 9). Other alcohols (e.g. ethylene glycol, glycerol, ethanol, trifluoroethanol, dihydroxymethane (hydrated formaldehyde) have also been shown to be useful in this regard, together with various other high polarity solvents. Further hydroxyl containing compounds which induce release of $CO_2$ include sugars such as glucose and fructose, oligosaccharides such as cotton, starch and alginic acid, and amino acids such as serine and related oligomers.

Thus, by means of the method of the present invention, it is possible to facilitate the use of capture agents for acid gases, specifically, the inexpensive and non-toxic carboxylic acids, which would usually be considered ineffective for this purpose because of their low $pK_a$ in water. Indeed, it is possible to achieve quite readily up to 93% decarboxylation at room temperature simply by increasing the water content of the solvent, and higher $CO_2$ loadings can also be achieved by increasing the concentration of the capture agent.

It is also apparent that a variety of water-miscible non-aqueous solvents, particularly polar aprotic solvents, can be used in this process. Thus, for example, changing from DMSO to N-methyl pyrrolidinone (NMP) showed comparable effects (entries 5, 9 and 10), and further options are discussed below.

As previously noted, the process is successfully carried out using carboxylates with a range of cations, including sodium, potassium, lithium, ammonium (including choline salts and betaine), and phosphonium salts.

Figure 2:
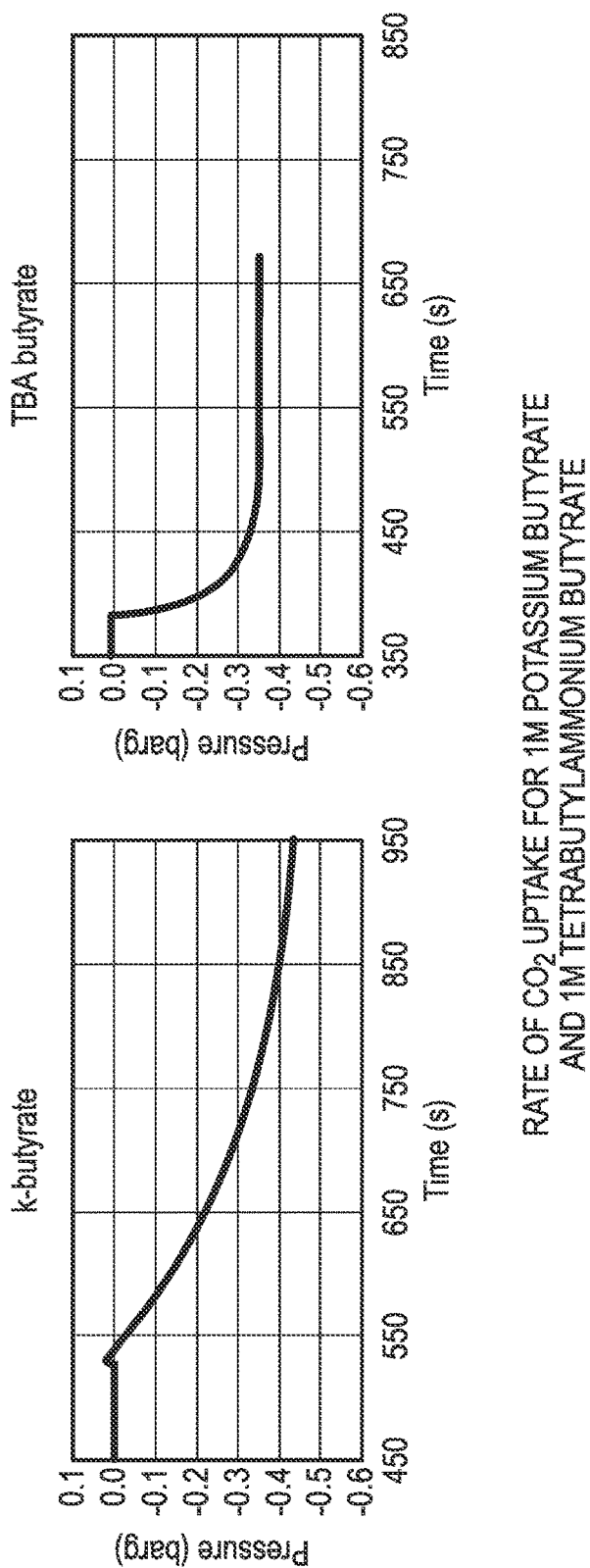
FIG. 2 provides a graphical representation of the rate of $CO_2$ uptake for 1M potassium butyrate and 1M tetrabutylammonium butyrate in the method according to the invention.

The inventors have, however, also established that the particular cationic group and solvent composition may affect the rate of $CO_2$ capture. Thus, for example, it was observed that the tetrabutylammonium cation showed an enhanced rate of $CO_2$ uptake when compared to the corresponding potassium salt, as illustrated in FIG. 2.

In one possible embodiment of the invention blends of different counter-ions, such as tetraalkylammonium- and alkali metal carboxylates may be used in a carbon capture process to ensure optimal performance, whilst solvent costs stay at a minimum.

It has also been established that the method of the invention may be successfully applied over a range of $CO_2$ pressures, as shown in Table 3. Thus, a lower initial pressure (0.6 bara) causes the $CO_2$ uptake capacity and rate to decrease slightly, whilst the release becomes more effective (entry 2). Higher initial pressure (1.5 bara), however, causes the $CO_2$ uptake capacity and rate to increase slightly, while the release becomes somewhat less effective (entry 3).

TABLE 3

VLE Performance at Different $CO_2$ Initial Pressures

| Entry | $P_{CO2}$ initial (bara)[a] | Fast Rate (1/s) | Fast Capacity (mol$_{CO2}$/L) | Full Capacity (mol$_{CO2}$/L) | Recovered $CO_2$ (%)[b] |
|---|---|---|---|---|---|
| 1 | 1 | 0.043 | 0.77 | 0.83 | 88 |
| 2 | 0.6 | 0.038 | 0.62 | 0.68 | 90 |
| 3 | 1.5 | 0.080 | 0.83 | 0.88 | 80 |

[a]1.36M TBAA solution in NMP containing 1 eq. water (sat. @40° C.), 10 mL of solvent was injected to VLE under $CO_2$ atmosphere;
[b]3 mL water was added to induce release The partial pressure of $CO_2$ in the gas stream which is to be purified influences the performance of the capture solvent. In order to ensure that the presently disclosed method is generally applicable to waste streams from a wide range of sources, several different gas compositions with varying $CO_2$ partial pressures were tested and the results are presented in Table 4.

TABLE 4

Representative Examples of Effect of Changing $CO_2$ Partial Pressure on Absorption Performance

| Entry | pCO$_2$ (mbar) | Capture System | Capacity (mol$_{CO2}$/L)[a] | Initial Rate (mmol$_{CO2}$/L/s)[b] |
|---|---|---|---|---|
| 1 | 50 | DBUP[c] in Octanol | 0.14 | 0.11 |
| 2 | 150 | K-Piv[d] in Sulfolane | 0.49 | 0.10 |
| 3 | 300 | K-Piv[d] in Diglyme | 1.12 | 0.41 |
| 4 | 500 | DBUP[c] in Octanol | 0.37 | 0.49 |

[a]Refers to the moles of $CO_2$ captured per litre of solvent during the measurement;
[b]refers to the rate of $CO_2$ absorption in the initial 500 s interval of the measurement;
[c]1,8-Diazabicyclo[5.4.0]undec-7-ene propionate;
[d]Potassium pivalate;
[e]Diethylene glycol dimethyl ether These effects are, however, seen to be marginal over the studied pressure range, and this demonstrates that the approach should be applicable over a wide variation of $CO_2$ concentrations, such as those in a real carbon capture processes ($CO_2$ levels of 3-15% of total flue gas), and for atmospheric $CO_2$ capture (ca. 400 ppm $CO_2$ present in air at 2013 levels).

Various commercially available solvents have been evaluated to exemplify the general applicability of the method, and the results are presented in Table 5. In general, all of the solvents tested showed a good level of performance, demonstrating the flexibility of the approach. It is important to emphasise that, in this instance, the term 'solvent' relates to organic molecules which solvate the capture agents (e.g. the carboxylate), rather than being the capture agents themselves (which is common terminology in post-combustion Carbon Capture and Storage technology (CCS)).

TABLE 5

VLE Performance of Tetrabutylammonium Acetate Dissolved in Various Water-Miscible Solvents

| Entry | Solvent[a] | Concentration ($mol_{TBAA}$/L) | Fast Rate (1/s) | Full Capacity ($mol_{CO2}$/L) | Water Added (mL) | Recovered $CO_2$ (%) |
|---|---|---|---|---|---|---|
| 1 | TMU | 1.45 | 0.058 | 0.85 | 3.0 | 86 |
| 2 | DMPU | 1.50 | 0.035 | 0.81 | 3.0 | 90 |
| 3 | DMI | 1.64 | 0.055 | 0.86 | 3.0 | 83 |
| 4 | THF[b] | 1.47 | 0.046 | 0.57 | 1.5 | 81 |
| 5 | MeCN | 1.50 | 0.066 | 0.62 | 2.0 | 85 |
| 6 | NMP | 1.50 | 0.051 | 0.88 | 5.0[c] | 95 |
| 7 | Sulfolane | 1.41 | 0.026 | 0.69 | 3.0 | 91 |

[a]TBAA + 1 eq. water (2-4%), saturated @40° C., 10 mL of solvent was injected to VLE under 1 bara $CO_2$ atmosphere;
[b]not corrected for solvent partial pressure, capacity is likely higher;
[c]early experiment, 3 mL water suffices to release the bulk of $CO_2$ From these data, it is apparent that suitable solvents for this purpose include, but are not limited to, dimethylsulphoxide (DMSO), N-methylpyrrolidinone (NMP), 1,1,3,3-tetramethylurea (TMU), N,N'-dimethyl-N,N'-trimethyleneurea (1,3-dimethyl-3,4,5,6-tetrahydro-2-pyrimidinone (DMPU)), 1,3-dimethyl-2-imidazolidinone (DMI), tetrahydrofuran (THF), acetonitrile and sulfolane.

The rate of $CO_2$ uptake varied only slightly with different solvents, and remained in the range of 0.035-0.066 1/s, whilst the capacity of $CO_2$ uptake varied with different solvents, but remained in the range of 0.57-0.88 $mol_{CO2}$/L. These values are not optimised, however, and it is believed that higher capacities can be achieved by using, for example, more concentrated solutions of the capture agents.

The amount of water necessary to induce an acceptable $CO_2$ release was found to be similar in the various solvents, although acetonitrile and THF (entries 4 and 5) required addition of significantly less water. These results suggest that the decisive factor between the solvent candidates will be commercial (price, availability) or their ability to separate from water (for example, using membranes) in the key solvent regeneration step which is essential for the cyclic absorption process.

It has also been observed that the initial water content of a solvent can have an effect on its activity, thereby allowing solvent composition to be tuned to optimise solvent performance for specific formulations and applications. The results of these trials are presented in Table 6.

TABLE 6

Effect of Water Content on VLE Performance of Tetrabutylammonium Acetate Solutions

| Entry | Water Content (V %)[a] | Concentration ($mol_{TBAA}$/L) | Fast Rate (1/s) | Full Capacity ($mol_{CO2}$/L) | Recovered $CO_2$ (%)[b] |
|---|---|---|---|---|---|
| 1 | 0 | 0.94 | 0.090 | 0.36 | 77 |
| 2 | 2 (1 eq) | 0.93 | 0.075 | 0.64 | 88 |
| 3 | 10 | 1.09 | 0.046 | 0.56 | 89 |
| 4 | 20 | 1.28 | 0.016 | 0.45 | 84 |
| 5 | 30 | 1.57 | 0.012 | 0.38 | 86 |
| 6 | 40 | 1.64 | 0.015 | 0.28 | 75 |
| 7 | 50 | 2.02 | 0.010 | 0.26 | 71 |

Figure 3:
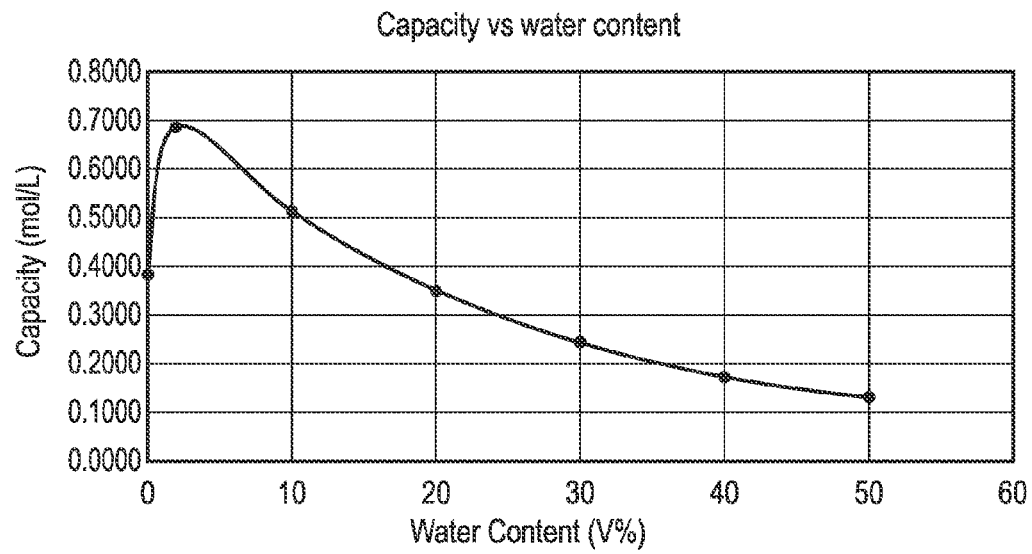
FIG. 3 is a graphical illustration of the carbon capture capacity of saturated tetrabutylammonium acetate solutions as a function of the water content in the method of the invention.

[a]TBAA solution in NMP-water mixture saturated @20° C., 10 mL of solvent was injected to VLE under 1 bara $CO_2$ atmosphere;
[b]3 mL water was added to induce release It is observed that the rate of $CO_2$ absorption is reduced by increasing water content (consistent with the reduced pKa of the capture agent). Trace amounts of water are seen to be particularly effective (entry 1), but reasonable activity is still shown with larger amounts of water present. The performance of the absorber drops steadily with more water present, but solutions containing 10-20% v/v water are still effective, which increases the operational window of this chemistry, as illustrated in FIG. 3.

The method of the invention is also shown to be successfully applied with a broad range of carboxylate salts, as shown in Table 7.

The results particularly show that the use of certain organic cations (e.g. using DBU as base) is successful in the process, provided that the carboxylate is formed substantially. Thus, for example, the salt formed from the reaction of butyric acid and a strong organic base such as DBU results in a viscous oil, which is soluble and/or miscible with NMP, and gives high uptake capacity and acceptable release properties. The use of weaker TEA (triethylamine) as a base was probably ineffective due to its weaker basic character and lower concentrations of carboxylate (entry 2), whilst guanidine acetate showed poor performance due to solubility limitations (entry 3). However, various multiprotic carboxylic acid salts (e.g. citrate and oxalate) showed reasonable activity, as did carboxylic acid salts containing α-hydroxy groups although the possible optimisation of the solvent—and hence $pK_a$—leaves scope for improvement in terms of reactivity and solubility. The results also show that ammonium salts such as choline, TMA (tetramethylammonium) and TBA (tetrabutylammonium) cations are effective (entries 8, 10 and 11).

TABLE 7

VLE Performance of Various Organic Base-Carboxylic Acid Salts in N-Methylpyrrolidinone

| Entry | Salt[a] | Concentration (mol/L) | Fast Rate (1/s) | Full Capacity ($mol_{CO2}$/L) | Water Added (mL) | Recovered $CO_2$ (%) |
|---|---|---|---|---|---|---|
| 1 | DBU[b] butyrate | 2.18 | 0.016 | 0.94 | 4 | 79 |
| 2 | TEA[c] butyrate | 1.00 | nd | 0.10 | 2 | 0 |
| 3 | Guanidine acetate | 0.50 | 0.029 | 0.34 | 2 | 83 |
| 4 | TBA citrate | 0.33 | 0.083 | 0.44 | 10[d] | 47 |
| 5 | TBA citrate | 0.50 | 0.054 | 0.63 | 10[d] | 38 |
| 6 | TBA oxalate | 1.50 | 0.042 | 0.41[e] | 0.6 | 48 |
| 7 | TBA lactate | 1.48 | 0.038 | 0.24 | 2.3 | 70 |
| 8 | TMA[f] propionate | 2.48 | 0.014 | 0.92 | 3.4 | 72 |
| 9 | BTMA[g] propionate | 0.70 | 0.065 | 0.44 | 3.0 | 79 |
| 10 | Choline propionate | 1.56 | 0.047 | 0.51 | 3.3 | 69 |
| 11 | Choline propionate | 2.50 | 0.017 | 0.66 | 3.9 | 69 |

[a]Solution in NMP containing 1 eq. water to carboxylate groups (sat. @r.t.), 10 mL of solvent was injected to VLE under $CO_2$ atmosphere, release was triggered by 3 mL water;
[b]DBU = 1,8-Diazabicycloundec-7-ene, the salt and NMP are miscible, the concentration displayed was chosen after preliminary screening;
[c]TEA = Triethylamine, not saturated, concentration is arbitrarily chosen;
[d]10 mL MeOH added;
[e]5 mL of solvent was injected to VLE under $CO_2$ atmosphere;
[f]TMA = Tetramethylammonium;
[g]BTMA = Benzyltrimethylammonium The relative ease of access and efficiency of DBU-carboxylate salts enabled a further solvent screen using DBU propionate. A wide variety of organic solvents was found to be compatible with the general concept as summarised below in Table 8.

TABLE 8

Absorption Performance of DBU Propionate in Various Organic Solvents

| Entry | Carrier Solvent | Capacity (mol$_{CO2}$/L)$^a$ | Initial Rate (mmol$_{CO2}$/L/s)$^b$ |
|---|---|---|---|
| 1 | 1,3-Dioxolane | 0.66 | 0.96 |
| 2 | Dioxane | 0.94 | 1.43 |
| 3 | 2-Ethyl-1-hexanol | 0.72 | 0.93 |
| 4 | 3,5,5-Trimethyl-1-hexanol | 0.71 | 0.72 |
| 5 | 4-Methyl-2-pentanol | 0.70 | 1.05 |
| 6 | 1-Butanol | 0.57 | 0.85 |
| 7 | 1-Pentanol | 0.58 | 0.84 |
| 8 | 1-Hexanol | 0.65 | 1.00 |
| 9 | 1-Heptanol | 0.73 | 0.92 |
| 10 | 1-Octanol | 0.68 | 0.88 |
| 11 | Dimethylsulfoxide (DMSO) | 0.96 | 1.41 |
| 12 | 1,1,3,3-Tetramethylurea (TMU) | 0.93 | 1.36 |
| 13 | Dimethylformamide (DMF) | 0.92 | 1.42 |
| 14 | 1,3-Dimethyl-2-imidazolidinone (DMI) | 0.98 | 1.39 |
| 15 | 1,3-Dimethyl,3,4,5,6-tetrahydro-2-pyrimidinone (DPMU) | 1.03 | 1.11 |

Capture composition: 1-4M 1,8-Diazabicyclo[5.4.0]undec-7-ene (DBU) propionate, 5-10% w/w water and the corresponding carrier solvent;
absorption conditions: 1 bar $CO_2$ at 40° C.;
$^a$refers to the moles of $CO_2$ captured per litre of solvent during the measurement;
$^b$refers to the rate of $CO_2$ absorption in the initial 500 s interval of the measurement Furthermore, absorption performance was tested under more realistic conditions comprising of low $CO_2$ partial pressure (150 mbar) at an absorption temperature of 40° C. In this case, potassium pivalate was chosen as a representative substrate, and the results are presented in Table 9.

TABLE 9

Absorption Performance of Potassium Pivalate in Various Organic Solvents

| Entry | Carrier Solvent | Capacity (mol$_{CO2}$/L)$^a$ | Initial Rate (mmol$_{CO2}$/L/s)$^b$ |
|---|---|---|---|
| 1 | Sulfolane | 0.46 | 0.05 |
| 2 | Cyclohexanone | 0.51 | 0.20 |
| 3 | Diethylene glycol dimethyl ether | 0.85 | 0.19 |
| 4 | Diethylene glycol diethyl ether | 0.87 | 0.15 |
| 5 | Diethylene glycol monomethyl ether | 0.10 | 0.10 |
| 6 | Diethylene glycol monoethyl ether | 0.52 | 0.11 |
| 7 | Diethylene glycol monopropyl ether | 0.38 | 0.10 |
| 8 | Diethylene glycol monobutyl ether | 0.52 | 0.09 |
| 9 | Ethylene glycol monoethyl ether | 0.45 | 0.15 |
| 10 | Ethylene glycol monopropyl ether | 0.42 | 0.14 |
| 11 | Ethylene glycol monobutyl ether | 0.58 | 0.11 |
| 12 | Propylene glycol monobutyl ether | 0.32 | 0.12 |
| 13 | Triethylene glycol dimethyl ether | 0.55 | 0.15 |
| 14 | Dipropylene glycol dimethyl ether | 0.79 | 0.15 |
| 15$^c$ | Dipropylene glycol dimethyl ether | 0.56 | 0.24 |

Capture composition: 1-4M Potassium pivalate, 10-25% w/w water and the corresponding carrier solvent;
absorption conditions: 150 mbar $CO_2$ at 40° C.;
$^a$refers to the moles of $CO_2$ captured per litre of solvent during the measurement;
$^b$refers to the rate of $CO_2$ absorption in the initial 500 s interval of the measurement;
$^c$potassium isobutyrate (rather than potassium pivalate)

Polymeric carboxylic acids can also be successfully used for this process. For example, alginic acid is a naturally occurring oligosaccharide extracted from seaweed that contains a carboxylic acid functional group on each monomer unit. An appropriate amount of 1,8-diazabicyclo[5.4.0]undec-7-ene (DBU) was added to a suspension of alginic acid in N-methylpyrrolidone (NMP) and water to form the corresponding DBU carboxylate salt. The resulting slurry showed substantial capacity for absorbing $CO_2$ (0.79 M) at room temperature. Increasing the water content of this carboxylated system to approximately 20% v/v resulted in 54% of the total $CO_2$ content being released.

In a further embodiment of the invention, blends of two or more carboxylate salts were employed and demonstrated a high level of performance, as illustrated by the data in Table 10.

TABLE 10

Absorption Performance of Carboxylate Blends

| Entry | Composition | Capacity (mol$_{CO2}$/L)$^a$ | Initial Rate (mmol$_{CO2}$/L/s)$^b$ |
|---|---|---|---|
| 1 | 1M KPiv$^c$, 2M KOAc$^d$ | 0.62 | 0.39 |
| 2 | 1.25M KPiv, 1.75M KOAc | 0.66 | 0.33 |
| 3 | 1.5M KPiv, 1.5M KOAc | 0.69 | 0.31 |
| 4 | 1.75M KPiv, 1.25M KOAc | 0.70 | 0.18 |
| 5 | 2M KPiv, 1M KOAc | 0.78 | 0.21 |
| 6 | 2.25M KPiv, 0.75M KOAc | 0.77 | 0.22 |
| 7 | 0.5M KPiv, 2.5M KProp$^e$ | 0.64 | 0.27 |
| 8 | 0.75M KPiv, 2.25M KProp | 0.58 | 0.30 |
| 9 | 1M KPiv, 2M KProp | 0.74 | 0.29 |
| 10 | 1.25M KPiv, 1.75M KProp | 0.72 | 0.19 |
| 11 | 1.5M KPiv, 1.5M KProp | 0.75 | 0.21 |
| 12 | 1.75M KPiv, 1.25M KProp | 0.78 | 0.20 |
| 13 | 1.5M KPiv, 1.5M KOAc | 0.53 | 0.25 |

Capture composition: stated salt concentration, 10-25% w/w water in diethylene glycol dimethyl ether;
absorption conditions: 150 mbar $CO_2$ at 40° C.;
$^a$refers to the moles of $CO_2$ captured per litre of solvent during the measurement;
$^b$refers to the rate of $CO_2$ absorption in the initial 500 s interval of the measurement;
$^c$potassium pivalate;
$^d$potassium acetate;
$^e$potassium propionate;
$^f$solvent is diethylene glycol diethyl ether In addition, the inventors investigated the effects achieved by the addition of accelerants to the system. Specifically, several different amine derivatives were tested as potential accelerants (alongside the potassium pivalate) in a representative solvent in order to establish their influence on $CO_2$ uptake rates. Representative examples of primary, secondary, and tertiary amines were screened to broaden the scope of the study and as shown in Table 11, an increase in absorption rate was observed, although there is the possibility that cyclic capacity may be affected due to the presence of the amine.

TABLE 11

Effect of Amine Accelerants on the Performance of Potassium Pivalate in Ethylene Glycol Monobutyl Ether

| Entry | Amine Accelerant | Capacity (mol$_{CO2}$/L)$^a$ | Initial Rate (mmol$_{CO2}$/L/s)$^b$ |
|---|---|---|---|
| 1 | 3-(Diethylamino)-1,2-propanediol (DAPD) | 0.91$^c$ | 0.11 |
| 2 | Tetramethylethylenediamine (TMEDA) | 0.54 | 0.15 |

TABLE 11-continued

Effect of Amine Accelerants on the Performance of Potassium Pivalate in Ethylene Glycol Monobutyl Ether

| Entry | Amine Accelerant | Capacity $(mol_{CO_2}/L)^a$ | Initial Rate $(mmol_{CO_2}/L/s)^b$ |
|---|---|---|---|
| 3 | 2-Diethylaminoethanol (DEAE) | 0.48 | 0.12 |
| 4 | Tetraethylmethanediamine (TEMDA) | 1.17 | 0.29 |
| 5 | Tetramethylmethanediamine (TMMDA) | 0.71 | 0.30 |
| 6 | 1,8-Diazabicyclo[5.4.0]undec-7-ene (DBU) | $0.70^d$ | 0.47 |
| 7 | Tetramethyl-1,3-diaminopropane (TMPDA) | $1.15^c$ | 0.16 |
| 8 | Triethylamine (TEA) | 0.41 | 0.15 |
| 9 | Monoethanolamine (MEA) | $0.80^e$ | 0.40 |
| 10 | Morpholine | $0.82^f$ | 0.40 |
| 11 | Piperazine | $0.63^g$ | 0.40 |

Capture composition: 1-4M Potassium pivalate, 16-25% w/w water, 16% amine relative to the salt in ethylene glycol monobutyl ether;
absorption conditions: 150 mbar $CO_2$ at 40° C.;
$^a$refers to the moles of $CO_2$ captured per litre of solvent during the measurement;
$^b$refers to the rate of $CO_2$ absorption in the initial 500 s interval of the measurement;
$^c$cyclic capacity 0.66M;
$^d$cyclic capacity 0.19M;
$^e$cyclic capacity 0.27M;
$^f$cyclic capacity 0.50M;
$^g$no release As previously discussed, regeneration of the capture composition, such that it may be used for further capture and release operations with further acid gases, is an important consideration, particularly in the context of providing a commercially attractive process. Consequently, it is desirable to not only provide for the capture and liberation of $CO_2$ or other acid gases, but also to provide a system which facilitates a return to the original ratio of solvents in the active capture solvent to allow for the subsequent re-use of the composition in further procedures. The regeneration process typically requires separation of the gas-releasing additive—the protic solvent or agent—from the original composition.

It is necessary to determine the minimum amount of release agent (usually water) necessary for $CO_2$ stripping. The energy demand associated with the removal of said agent in the subsequent solvent reset stage has a profound effect on the overall energetics of the process. Therefore, it is necessary to maximise the volume of $CO_2$ that can be recovered from a carboxylated solvent per unit of release agent added. A revised stripping experiment was designed (1 bar $CO_2$ atmosphere, 60° C. solvent temperature) to simulate realistic conditions and test release performance with different amounts of release agent.

Figure 4:
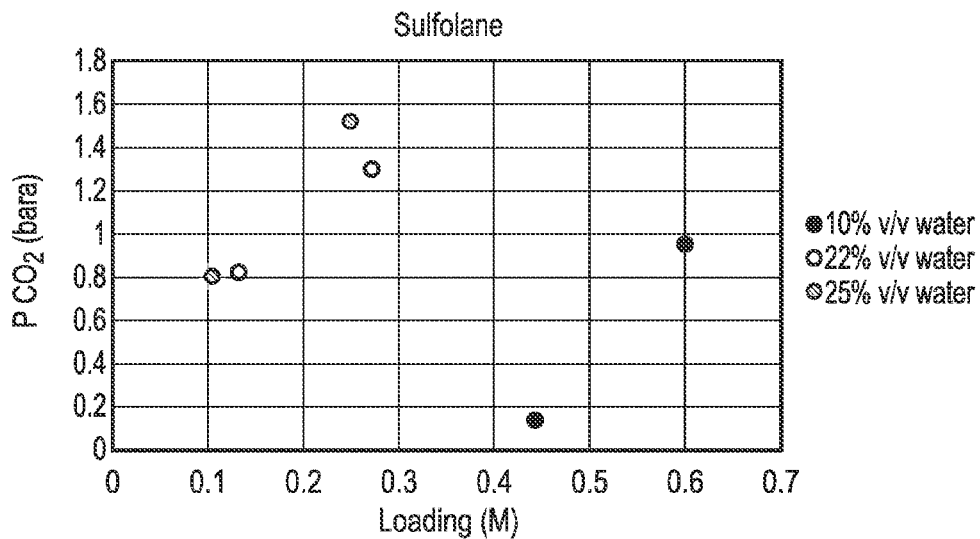
FIG. 4 shows a graphical representation of the vapour liquid equilibria of a potassium pivalate system in sulfolane with varying water content.
Figure 5:
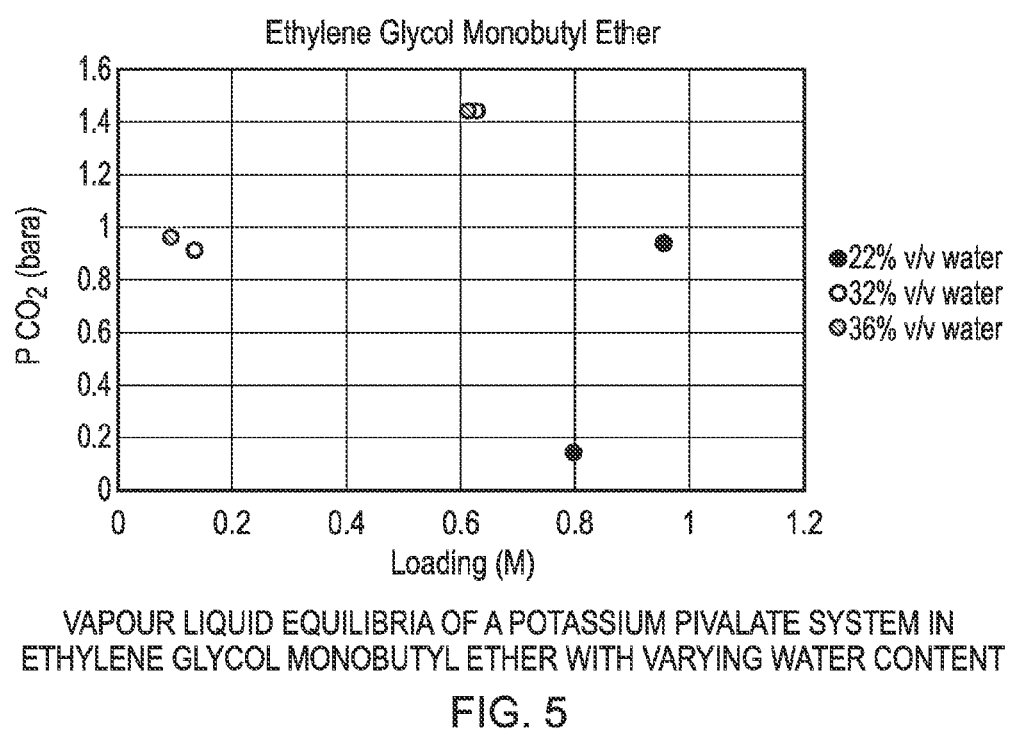
FIG. 5 provides a graphical illustration of the vapour liquid equilibria of a potassium pivalate system in ethylene glycol monobutyl ether with varying water content.

Two representative examples are presented in FIGS. 4 and 5, with sulfolane and ethylene glycol monobutyl ether being employed as solvents. The results clearly show the different $CO_2$ loadings possible with different water content on the basis of VLE experiments and it is seen that the water content could be varied from values of 10% and 36% to control the potential $CO_2$ loading.

Various alternative procedures are available in order to achieve control of release agent content, and the choice usually depends on the amount of added release agent—typically water—that needs to be removed from the composition, and the nature of the water-miscible, non-aqueous solvent.

Removal of the gas-releasing additive—particularly water—may, for instance, be achieved by the use of a suitable membrane, examples of which would be readily apparent to those skilled in the art. In a possible embodiment of the invention, membranes may be used to separate organic solvents from water. It has been demonstrated that several types of permeable membranes can be used to selectively permeate either an organic solvent or water from a mixture from a mixture of the two materials. Hydrophilic membranes may be used to selectively permeate water, and hydrophobic membranes can be used to selectively permeate organic solvents. This has been shown for a variety of different solvents over several temperatures, as summarised in Table 12.

TABLE 12

Composition of Permeates for Different Solvents Through Either Hydrophilic or Hydrophobic Membranes

| Entry | Solvent (% w/w) | Membrane | Pressure (Bar) | Temperature (° C.) | Permeate Composition$^a$ (% w/w) | | Separation Factor $(S_F)^b$ |
|---|---|---|---|---|---|---|---|
| | | | | | Organic Solvent | $H_2O$ | |
| 1 | Diglyme-water (50-50) | PTFE | 1 | 45 | 67.3 | 32.7 | 2.06 |
| 2 | Diglyme-water (50-50) | PTFE | 1 | 60 | 68.4 | 31.6 | 2.16 |
| 3 | Diglyme-water (84-16) | Silica | 1 | 30 | 67 | 33 | 0.39 |

TABLE 12-continued

Composition of Permeates for Different Solvents Through
Either Hydrophilic or Hydrophobic Membranes

| Entry | Solvent (% w/w) | Membrane | Pressure (Bar) | Temperature (° C.) | Permeate Composition[a] (% w/w) Organic Solvent | $H_2O$ | Separation Factor $(S_F)$[b] |
|---|---|---|---|---|---|---|---|
| 4 | Diglyme-water (84-16) | Silica | 3 | 60 | 75 | 25 | 0.57 |
| 5 | Diglyme-water (67-33) | Silica | 2 | 45 | 54 | 46 | 0.58 |
| 6 | Diglyme-water (50-50) | Silica | 3 | 30 | 49 | 51 | 0.96 |
| 7 | Diglyme-water (30-70) | Silica | 1 | 30 | 10 | 90 | 0.26 |
| 8 | Diglyme-water (30-70) | Silica | 3 | 30 | 24 | 76 | 0.74 |
| 9 | Sulfolane-water (66-34) | PTFE | 1 | 30 | 68 | 32 | 1.10 |
| 10 | Sulfolane-water (66-34) | PTFE | 1 | 45 | 70 | 30 | 1.18 |
| 11 | Sulfolane-water (66-34) | Silica | 2 | 30 | 66 | 34 | 0.97 |
| 12 | TMU-water (70-30) | Silica | 2 | 30 | 69 | 31 | 0.94 |
| 13 | TMU-water (70-30) | Silica | 1.2 | 45 | 69 | 31 | 0.94 |
| 14 | TMU-water (70-30) | Silica | 2 | 45 | 69 | 31 | 0.97 |
| 15 | TMU-water (70-30) | Silica | 1.2 | 60 | 69 | 31 | 0.97 |
| 16 | BuOH-water (70-30) | Silica | 2 | 30 | 64 | 36 | 0.77 |
| 17 | BuOH-water (70-30) | Silica | 2 | 45 | 64 | 36 | 0.76 |
| 18 | BuOH-water (70-30) | Silica | 2 | 60 | 62 | 38 | 0.69 |

Figure 6:
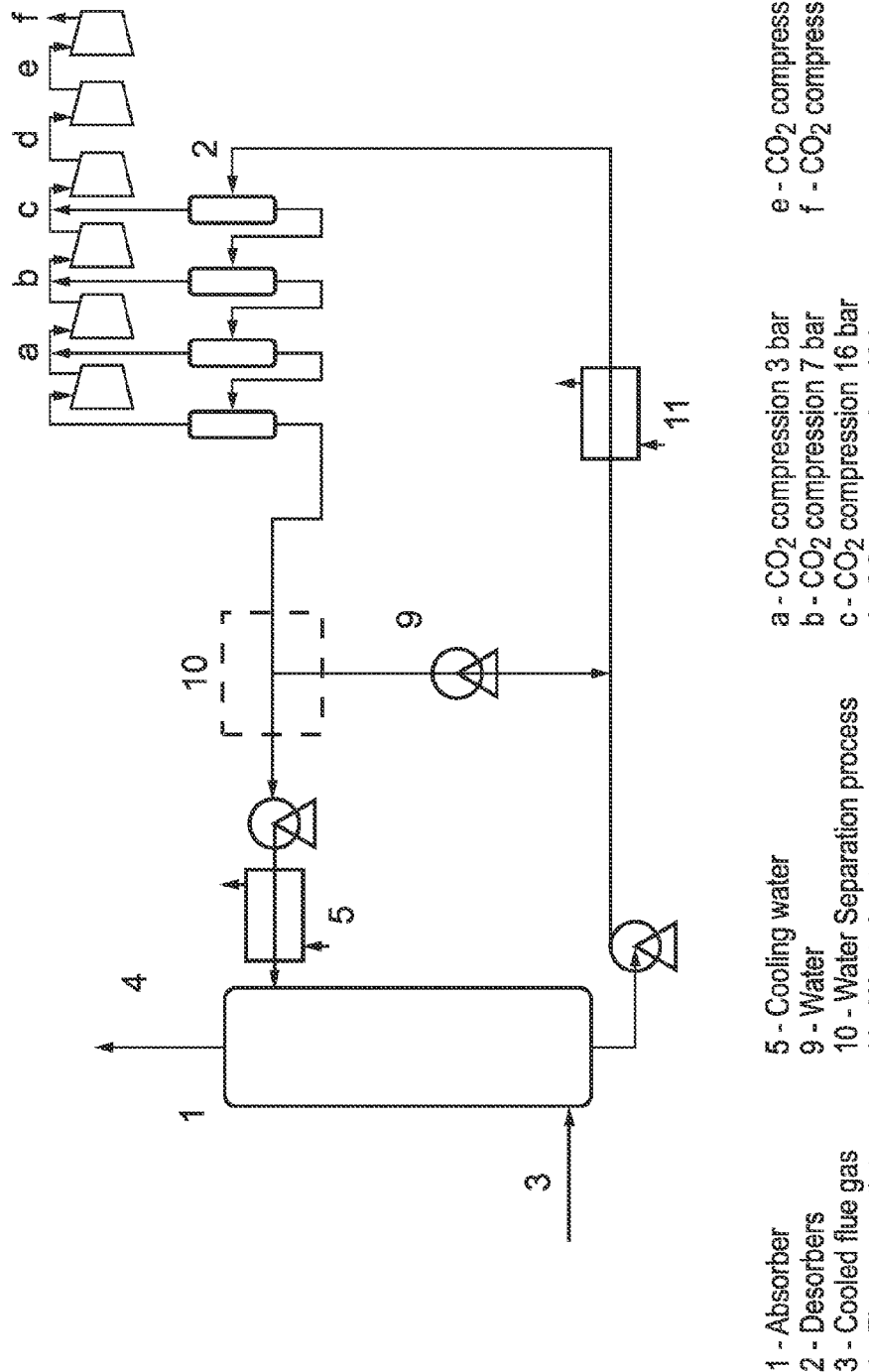
FIG. 6 provides a schematic representation of a low temperature capture process according to the invention.

[a]Refers to the composition of the solvent that permeated through the membrane;
[b]refers to the permeation flux through the membrane In FIG. 6, there is illustrated an example of a system and process which utilises the specific features of the present invention. The absorption part of the process is essentially the same as for a conventional process. The gas-rich solvent is then combined with a water rich stream, thereby inducing a pKa change in the solvent, which pressurises the liquid flow. The flow is heated with waste heat to introduce the heat required to overcome the desorption enthalpy, and the warm rich solvent is then flashed in several vessels in series, where the first vessel will release most of the $CO_2$ at high pressure; this reduces the need for $CO_2$ compressors and/or large size equipment.

After releasing at high pressure, the solvent can be further stripped at lower pressures; this results in lower flows of low pressure $CO_2$ compared to the processes of the prior art, thus allowing for the use of smaller, low pressure compressors and, consequently, requiring less compression energy on the whole apparatus. In a separate unit operation, the water fraction in the solvent is lowered to reset the pKa value of the capturing composition to the optimum level for acid gas absorption, and this solvent is fed to the absorber. The separated water-rich phase is fed back to the gas-rich solvent stream.

Substantial energy savings can be achieved by creating a high pressure $CO_2$ stream in the release stage, thereby reducing compressor duty. Stripping efficiency is expected to be lower at elevated $CO_2$ partial pressures as it creates a considerable strain on release. In a possible embodiment of the invention, a cascade of release tanks is envisaged to strip a portion of $CO_2$ at higher pressure and the rest in subsequent lower pressure steps to maintain high cyclic capacity while lowering the energy costs associated with compression. To determine the feasibility of stripping at higher pressures, a process was conducted using a 1 M solution of tetrabutylammonium acetate in NMP. The carboxylated solution was placed in a pressure reactor and additional $CO_2$ was introduced to increase the pressure inside to 23 bar. Upon water addition, the pressure rose to 30 bar indicating $CO_2$ release. Additionally, a series of release experiments was conducted using DBU propionate solutions in NMP, demonstrating that 29% of the total $CO_2$ content can be stripped against $CO_2$ partial pressure as high as 3.8 bar at 60° C.

Several water separation unit operations are suitable for use in the context of the present invention. Specific unit operations are illustrated in FIGS. 7 to 9, although these are by no means limiting of the scope of the invention.

Figure 7:
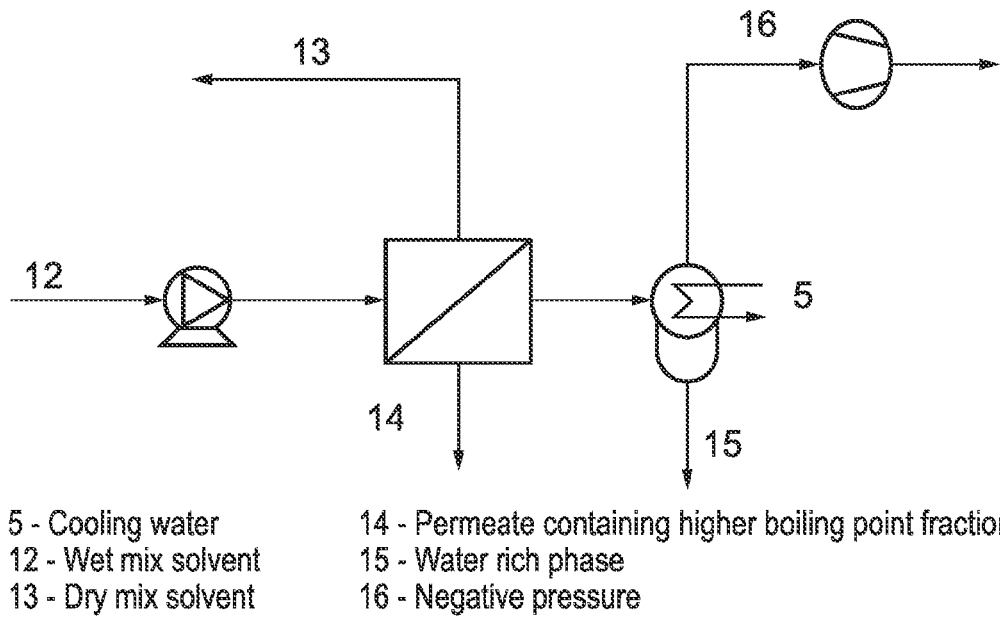
FIG. 7 depicts the use of a pervaporation membrane for solvent regeneration according to the invention.
Figure 8:
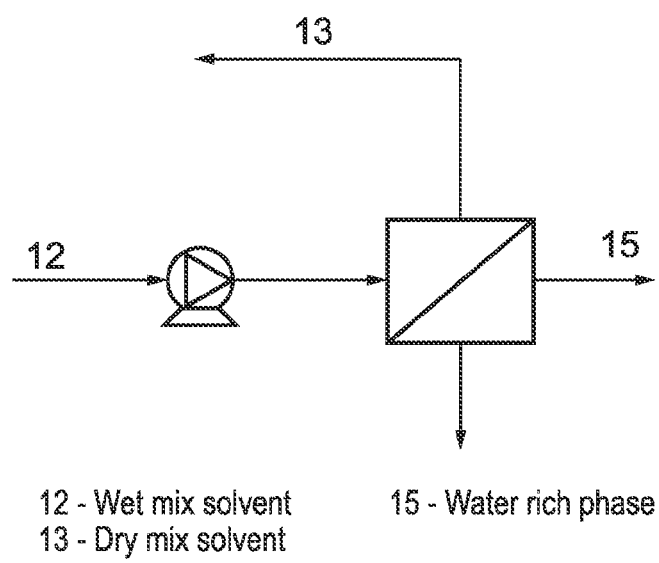
FIG. 8 illustrates the use of a conventional membrane for solvent regeneration according to the invention.
Figure 9:
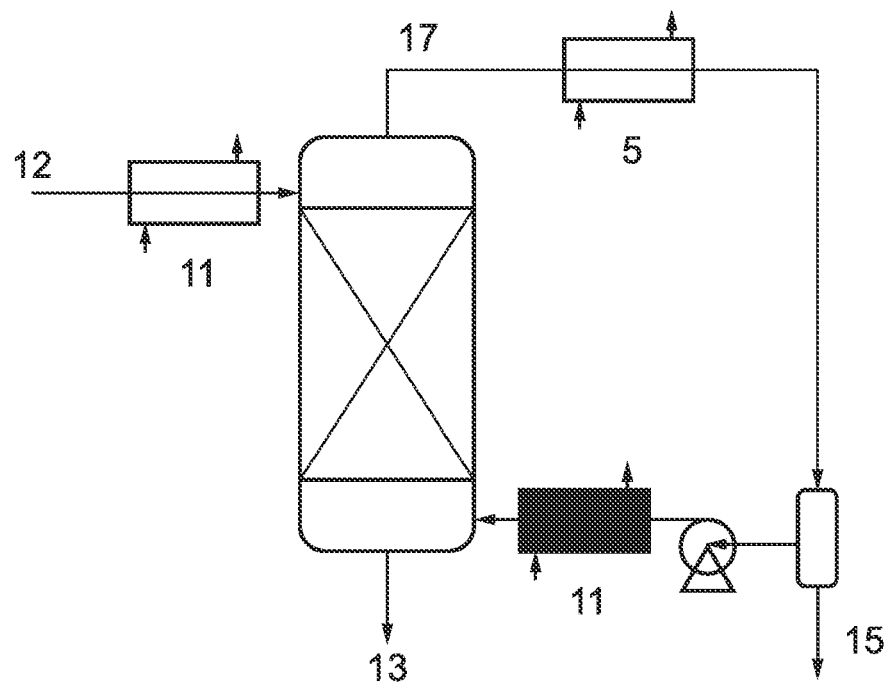
FIG. 9 provides a schematic representation of a water separation process using hot carrier gas according to the invention.
Figure 10:
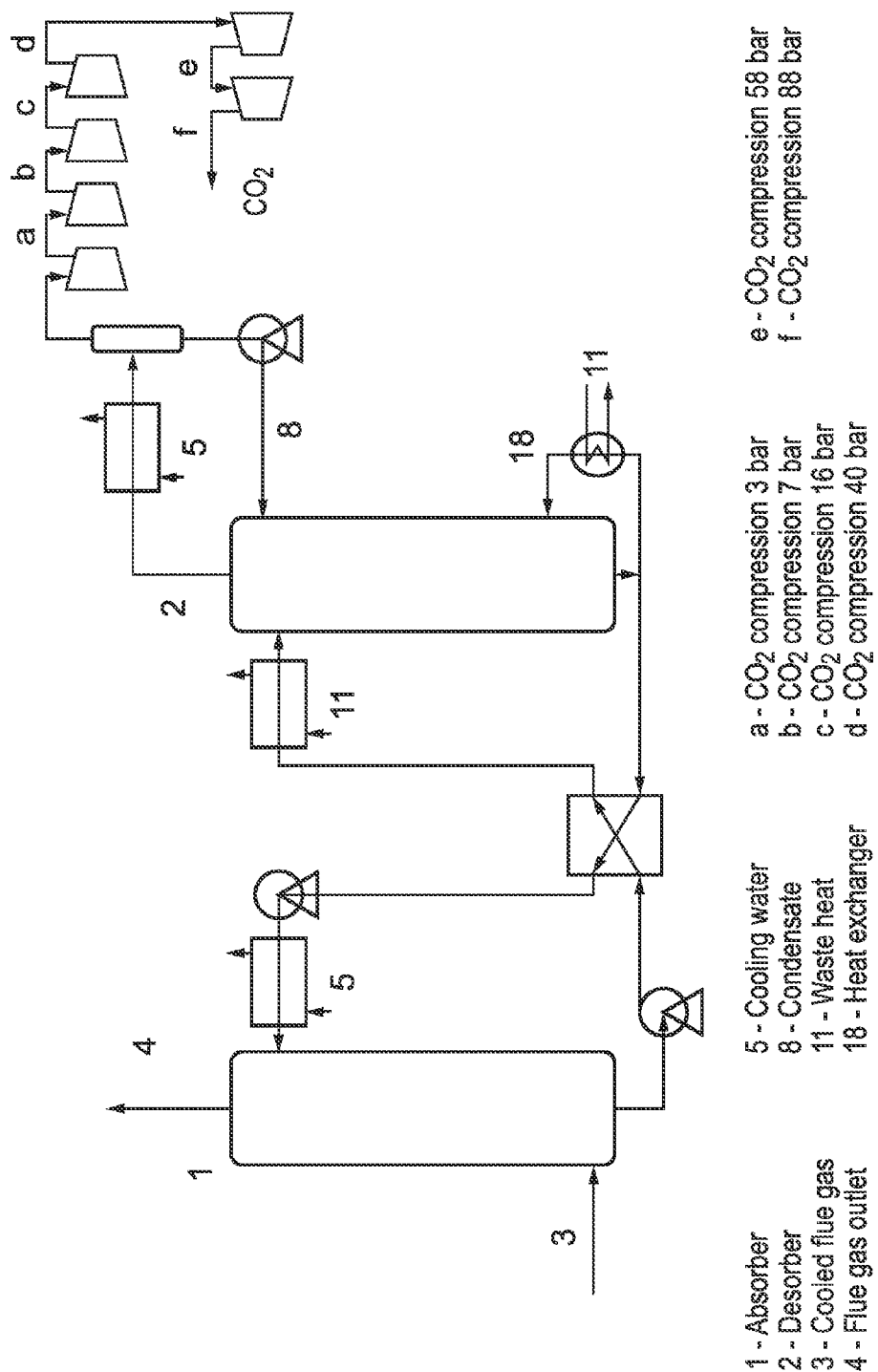
FIG. 10 is a schematic representation of a further low temperature capture process according to the invention.

FIGS. 6 to 8 are illustrations of such unit operations but the invention is not limited to these unit operations. Indeed, any water separation process can be selected from those which are known to those skilled in the art. Specifically, FIGS. 7 and 8 show a pervaporation membrane process and a conventional membrane process, respectively.

Thus, lean solvent obtained after release of the acid gas is fed to a membrane unit, slightly heated by waste heat to overcome the energy required for separation (e.g. evaporation enthalpy of the water and/or heat of dissolution) where the water is separated by diffusing through the membrane by a pressure difference over the membrane, provided by a high liquid pressure inside the membrane and/or a low pressure on the permeate side, which may be provided by e.g. a vacuum pump. The low pressure on the permeate side can also be achieved by a vertical liquid column and liquid pump, as only a slightly negative pressure is required on the permeate side; such an arrangement would result in a more energy efficient process and less chance of losing the permeate product to e.g. the vacuum line.

Investigations with the pervaporation system have shown that two liquid fractions can be collected. After the solvent permeates the membrane, the higher boiling point fraction condenses immediately and can be collected near the membrane, whilst the vapour fraction containing predominantly water can be condensed in a separate phase. The conventional membrane system, on the other hand, generates one permeate stream.

Hence, pervaporation can be used for the partial or complete removal of a release agent. An experiment with a $TiO_2$ pervaporation membrane demonstrated that a solvent feed of NMP-water could be enriched in water on the permeate side as shown in Table 13.

TABLE 13

Water Separation from Capture Solvents Using Pervaporation

| Solvent | Solvent (% v/v) | Water (% v/v) | Evaporation Settings | | Condensate | |
|---|---|---|---|---|---|---|
| | | | Pressure (mbar) | Temperature (° C.) | Solvent (% v/v) | Water (% v/v) |
| NMP[a] | 80 | 20 | 250 | 76 | 21 | 79 |
| NMP[a] | 50 | 50 | 250 | 76 | 16 | 84 |

[a]N-Methylpyrrolidinone

A further process for the separation of water may comprise a distillation process, an example of which is illustrated in FIG. 9. In this process the lean solvent is heated using waste heat to overcome the heat of evaporation. The warm solvent is contacted with warm carrier gas (e.g. air), preheated using waste heat, in a liquid gas contactor (e.g. a packed column) where the water vapour is preferentially evaporated into the gas stream. The dry solvent can be recovered from the bottom of the stripper, whilst the wet carrier gas is subsequently cooled and the condensate is recovered, and the cold carrier gas is heated up again by waste heat and fed to the liquid gas contactor. Experiments and calculations have shown that such a process can operate with a very small temperature difference between cold and hot carrier gas, and this scenario is especially suited for utilising waste heat.

In laboratory scale studies, the removal of water at 80° C. in an air stream has been achieved and this can significantly reduce energy requirements, and this indicates that the water content of the solution can be adjusted back within the desired range by such an approach, as shown in Table 14.

TABLE 14

Water Removal by Distillation at 80° C. in Air Stream

| Fraction[a] | Volume (mL) | Density (g/mL) | Refractive Index | Water Content (%) |
|---|---|---|---|---|
| 1 | 10 | 0.994 | 1.3351 | 98 |
| 2 | 19 | 0.996 | 1.3371 | 97 |
| 3 | 18 | 0.997 | 1.3419 | 93 |
| 4 | 10 | 1.01 | 1.3760 | 71 |
| Residue | ~150 | nd | 1.4679 | 5-7 |

[a]210 mL NMP-water mixture (2:1) was heated up to 80° C. and air was bubbled through it. Different fractions of the distillate were collected and their water content determined by measuring refractive indexes In an embodiment of the invention, $CO_2$ stripping is carried out by using a stream of air passing through the solvent without the addition of a release agent. In this way, the energy penalty associated with the removal of said release agent can be avoided. A procedure was conducted to demonstrate the feasibility of this approach, wherein a solution of potassium pivalate in diethylene glycol dimethyl ether was carboxylated in the usual manner, followed by air stream stripping at 40° C., resulting in a considerable decrease in $CO_2$ loading ($\Delta c=0.6M$).

As previously reported, the use of alternative protic solvents or agents, most particularly lower boiling point, small chain alcohols, has been successfully demonstrated for $CO_2$ release and may minimise energy consumption. Experiments have confirmed that methanol is a suitable, albeit slightly less effective, alternative to water in the release phase.

A further alternative method for removal of the gas-releasing additive is to flash the lean solvent under a slight negative pressure. The lean solvent is heated with waste heat and pumped through a valve. After the valve, the solvent is subjected to a slight negative pressure to provide a driving force for the water to evaporate. The slight negative pressure can be provided by a vertical liquid column and liquid pump, or by a conventional vacuum pump.

Alternatively, a gas-releasing additive such as water could be removed by distillation, at atmospheric or reduced pressure.

Different forms of distillation are well established on both laboratory and industrial scales. The feasibility of applying distillation to manipulate the amount of release agent in the solvent was investigated with several different compositions. Representative examples were selected to serve as proof of principle. A solution of 3 M potassium pivalate in diethylene glycol dimethyl ether (diglyme) and 16% w/w water was distilled at 300 mbara to give a distillation temperature of about 70° C. The vapour contained 55±5% w/w water based on 15 independent experiments, the remaining fraction consisting of diglyme. The pivalic acid and potassium pivalate content of the condensate was negligible. The same solvent was also distilled at about 80° C. and 500 mbara but no significant difference in gas phase composition was observed (53% w/w water in vapour), thus showing that distillation temperature and pressure have little effect on the equilibrium.

Figure 11:
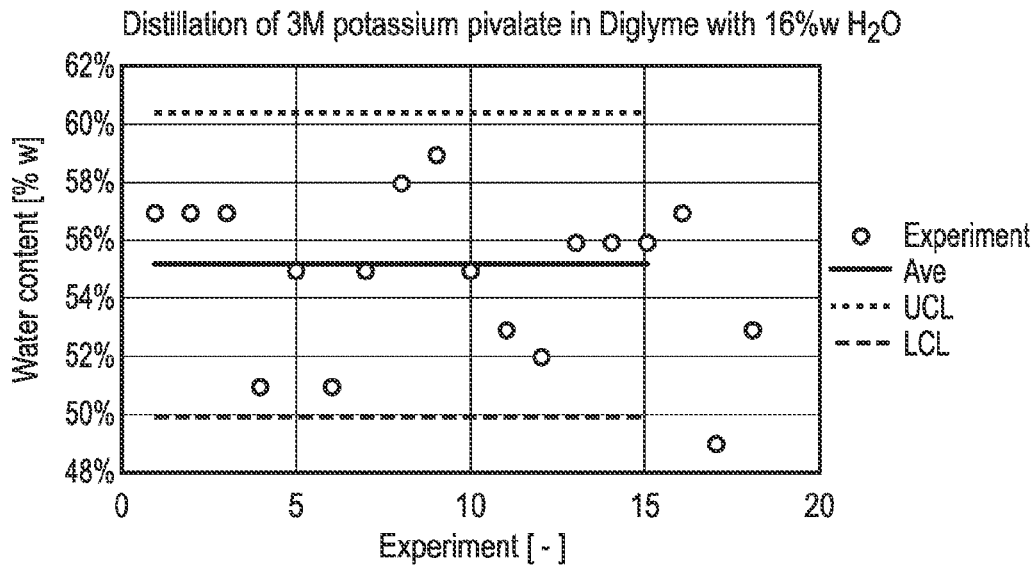
FIG. 11 is a graphical representation of the results of a distillation process using 3 M potassium pivalate in diglyme with 16% w/w water.

In the experimental procedure, solvent compositions were fractionally distilled to remove water in a 100 mL round bottom flask using an electrical heater jacket. The temperature of the vapour and liquid was recorded with T-type thermocouples and values were logged with Labview. The pressure in the distillation apparatus was controlled by an Edwards vacuum pump and the pressure was monitored with an Omega manometer. The vapour was condensed using a water cooled glass condenser and the composition of the condensate was analysed by NMR and verified by Karl Fischer titration. The results obtained are illustrated in FIG. 11.

Figure 12:
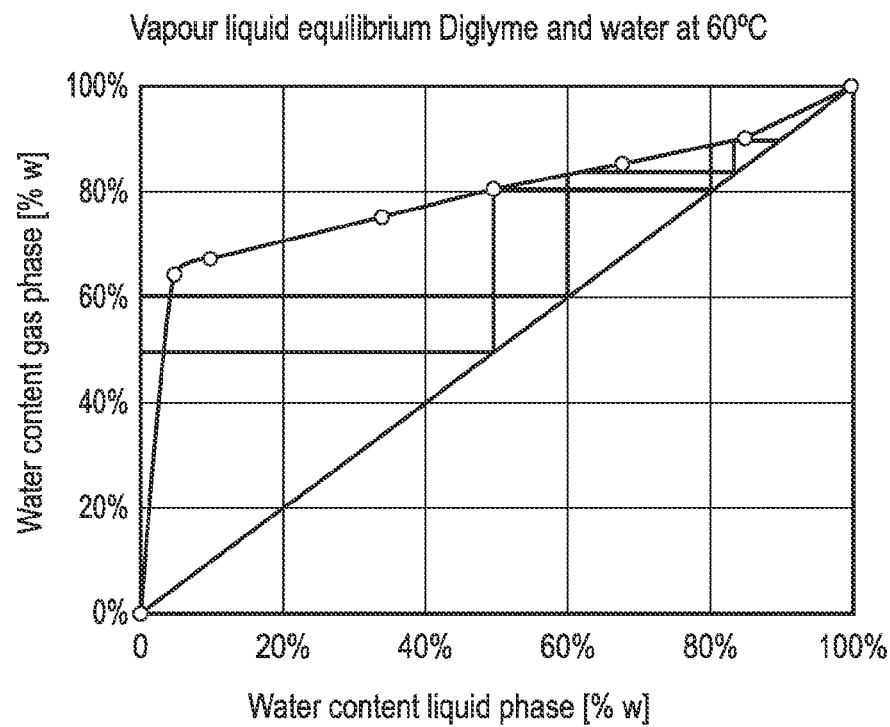
FIG. 12 provides a graphical illustration of the vapour liquid equilibria of diglyme-water at 60° C.

The vapour obtained from the solvent as described above may require further purification as its water content is low for use in the release step. The vapour liquid equilibrium for diglyme and water was experimentally determined at 60° C. and is shown in FIG. 12. Mass balance calculations based on experimental data can be used to predict the vapour and condensate compositions in subsequent equilibrium stages. One additional stage would result in a water content of 77-83% w/w in the condensate, which is high enough for reuse as a release agent. A third stage would result in 88-89% w/w pure water. Instead of distillation, the solvent could also be flashed under similar conditions in 2 to 3 stages to achieve the same purity.

As illustrated by the data presented in Table 15, structurally similar carrier solvents demonstrate slight variation in the water content of the vapour phase.

TABLE 15

Vapour Composition Above Selected Capture Solvents at 60° C.

| | Solvent | | Vapour Composition (% w/w) | | |
|---|---|---|---|---|---|
| Entry | Component 1 | Component 2 | Component 1 | Component 2 | Component 3 |
| 1 | Proglyde[a] | — | 39 | — | 61 |
| 2 | Proglyde[a] | Diglyme[b] | 24 | 24 | 52 |
| 3 | Triglyme[c] | Diglyme[b] | 10 | 35 | 55 |
| 4 | EGBE[d] | Diglyme[b] | 10 | 33 | 57 |

Solvent composition: 3M Potassium pivalate, 16% w/w water in Component 1:Component 2 50:50;
vapour phase was sampled at an equilibrium temperature of 60° C.;
vapour composition was determined by NMR;
[a]propylene glycol dimethyl ether;
[b]ethylene glycol dimethyl ether;
[c]triethylene glycol dimethyl ether;
[d]ethylene glycol monobutyl ether In an embodiment of the invention a mechanical vapour recompression (MVR) evaporator is used to minimise the energy requirement for flashing or distillation by compressing the vapour to slightly elevated pressures and temperatures to condense it and thereby provide the heat required for evaporation. Alternatively, steam can be injected to compress the vapour to elevated pressures and temperatures. In this manner, only a small heat input is required to evaporate large quantities of the release agent, resulting in an energy efficient method of separation.

According to this procedure, solvent was fed at a rate of 10-20 L/h to an evaporation unit utilising mechanical vapour recompression. Between 0.5 and 2 L/h of release agent was evaporated at temperatures ranging from 60° to 97° C. and pressures ranging from 100 to 800 mbara. The results are presented in Table 16.

TABLE 16

Water Separation from Capture solvents Using Mechanical Vapour Recompression (MVR)

| | Feed Composition (% w/w) | | | Evaporation Setting | | Outlet Composition (% w/w) | | | Condensate (% w/w) | |
|---|---|---|---|---|---|---|---|---|---|---|
| Solvent | Salt[a] | Solvent | Water | Pressure (mbara) | T (° C.) | Salt[a] | Solvent | Water | Solvent | Water |
| EGBE[b] | 35 | 37 | 28 | 478 | 98 | 41 | 39 | 20 | 22 | 78 |
| EGBE[b] | 35 | 37 | 28 | 600 | 97 | 38 | 39 | 23 | 13 | 87 |
| Diglyme[c] | 35 | 39 | 26 | 350 | 75 | 40 | 39 | 21 | 37 | 63 |
| Diglyme[c] | 35 | 39 | 26 | 350 | 84 | 43 | 38 | 19 | 43 | 57 |

[a]Potassium pivalate;
[b]ethylene glycol monobutyl ether;
[c]diethylene glycol dimethyl ether The condensate composition calculated from the mass balance was in good agreement with that determined experimentally by NMR. Average water contents of 55% and 90% w/w were found for diglyme and EGBE respectively. It was demonstrated that the diglyme condensate can be further purified by an additional evaporation step or by fractional condensation (vide supra). Alternatively the condensate can be further purified by membrane filtration.

Still further approaches to the removal of the gas-releasing additive include the adsorption of water into hydrophilic materials, such as cellulose, cotton, starch, polyethylene glycols or polyacrylic acids or, when using other protic solvents, adsorption of these solvents into more hydrophobic materials, for example organic polymers such as polyesters, polystyrene, polyvinylchloride, polyethylene, polypropylene, polylactic acid, ion exchange resins, perfluorinated materials and siloxanes.

Figure 13:
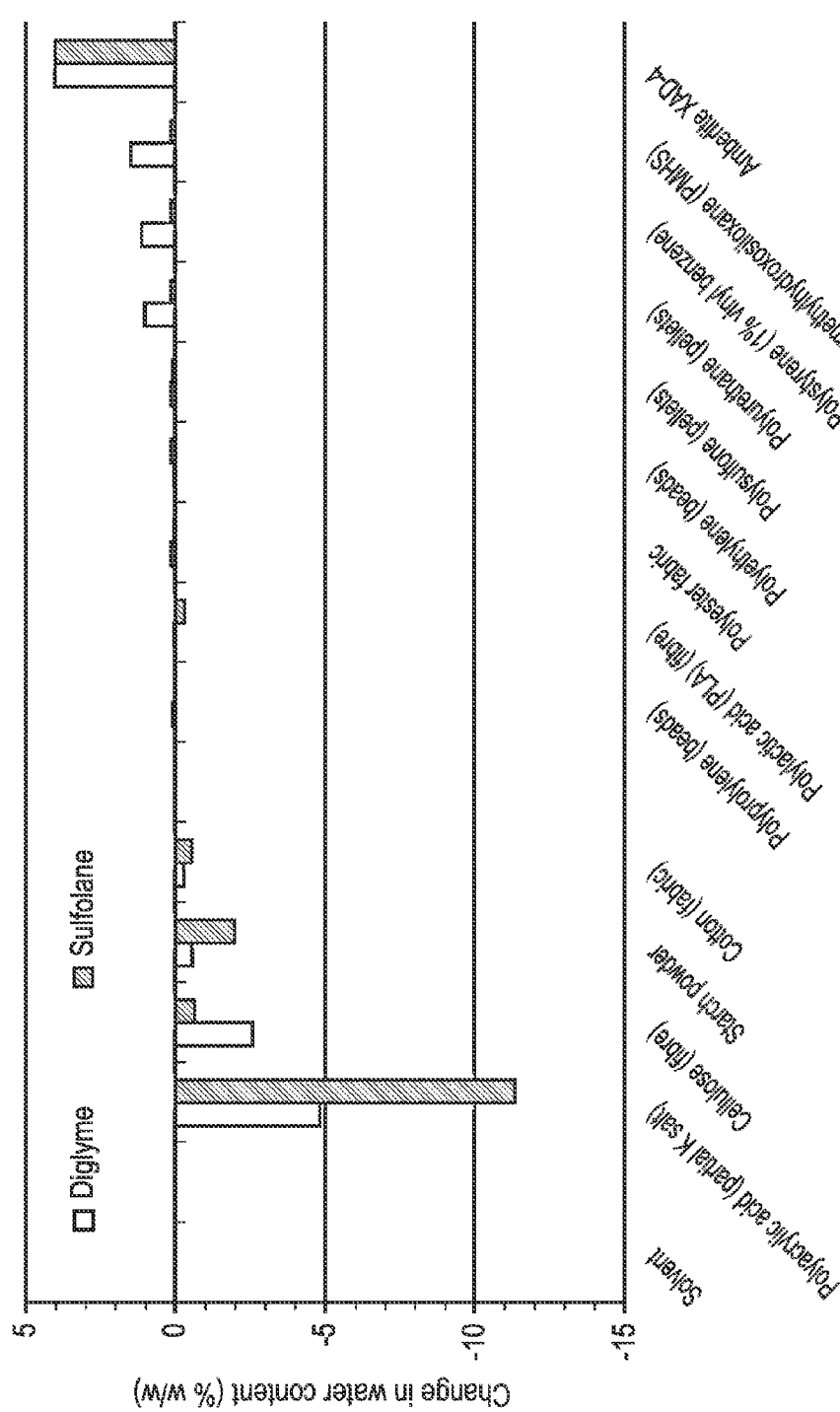
FIG. 13 shows a graphical representation of changes in water content observed after addition of sorbent materials to organic-water mixtures.

A variety of hydrophilic and hydrophobic materials was found to be able to alter the composition of aqueous-organic mixtures by selective sorption of either water or the organic component. Hydrophobic materials selectively adsorbed organic solvents, and hydrophilic materials selectively adsorbed water, as demonstrated with representative examples and illustrated in FIG. 13, which shows results at a solvent to sorbent ratio of 5:1 and an initial water content of 30% w/w for various hydrophilic materials (to the left of the chart) and hydrophobic material (to the right of the chart).

A variation of this general approach is to use stimuli-responsive polymers, such as thermally responsive polymers, which are also known as "smart" or "environmentally sensitive" polymers, which undergo physical structural changes in response to changes in their environment. One such example is poly(N-isopropylacrylamide) which, when heated above its lower critical solubility temperature, switches from a hydrophilic to a hydrophobic state, thereby expelling the water contained therein and losing about 90% of its volume in the process. Such a polymer, being present in situ during the capture process, could allow enhancement of water levels on warming, and hence induce decarboxylation and, on cooling, would rehydrate (and hence effectively remove water from the active solvent) to reactivate the solvent for $CO_2$ capture.

Alternatively, other processes well known in the art may be employed, including, for example, thermal regeneration, solvent stripping, the use of vacuum or pressure, or mechanical regeneration (e.g. removal of solvent by squeezing an absorbent material composition between rollers or under pressure). It is noted that such processes may also be applied to the regeneration of hydrophilic or hydrophobic materials which have been utilised for the adsorption of protic solvents or agents.

A further alternative process may involve electrolysis of the water rich solution after $CO_2$ release. Although such a procedure would require the use of electricity, and thereby reduce the likely efficiency of the overall process, it would also produce oxygen and hydrogen gas as by-products and these materials themselves are useful and valuable commodities which would offset the cost of additional electricity generation.

A still further alternative process utilises solvent mixtures that allow a phase separation at some stage in the process, thereby facilitating separation of the non-aqueous water-miscible solvent from the release solvent (typically water). In this case, solvents which have partial miscibility with the release solvent (typically water) are particularly suitable.

The inventors have also demonstrated the overall greater efficiency of the carboxylate-based formulations which are used according to the present invention when compared with the typically amine-based, compositions disclosed by the prior art. The heat of formation of carbamates in amine based absorbers accounts for a large portion of the energy demand of $CO_2$ release, whilst solutions of carboxylic acid salts are more easily stripped of their $CO_2$ content, which would lead to an expectation that lower desorption temperatures might be achieved. The efficiency of stripping will vary depending on the effective pKa of the acid in the process, and this can be fine-tuned by optimisation of the solvent composition.

TABLE 17

Absorption Performance and Low Temperature Thermal Regeneration of TBAA Solutions in NMP-Water Mixed Solvent

| Entry | Water Content (V %)[a] | Concentration ($mol_{TBAA}$/L) | Fast Rate (1/s) | Full Capacity ($mol_{CO2}$/L) | Recovered $CO_2$ @80° C. (%)[b] |
|---|---|---|---|---|---|
| 1 | 0 | 0.94 | 0.090 | 0.36 | 74 |
| 2 | 2 (1 eq) | 0.93 | 0.075 | 0.64 | 69 |
| 3 | 10 | 1.09 | 0.046 | 0.56 | 80 |
| 4 | 20 | 1.28 | 0.016 | 0.45 | 72 |
| 5 | 30 | 1.57 | 0.012 | 0.38 | 74 |
| 6 | 40 | 1.64 | 0.015 | 0.28 | 67 |
| 7 | 50 | 2.02 | 0.010 | 0.26 | 62 |

[a]TBAA solution in NMP-water mixture saturated @20° C., 10 mL of solvent was injected to VLE under 1 bara $CO_2$ atmosphere;
[b]The carbon rich solution was heated up to 80° C. without changing the NMP/water ratio of the mixture In order to illustrate this point, carboxylate-based formulations, comprising tetra-N-butyl ammonium acetate (TBAA) solutions in NMP, were prepared made up with varying initial water contents and were then tested under conventional absorption-thermal regeneration cycles. It was found that effective stripping of carbon dioxide was achieved at temperatures as low as 80° C., as can be seen from the data presented in Table 17.

The general applicability of the method of the invention was exemplified by repeating the above tests using potassium acetate as the carboxylate salt, and the results obtained are shown in Table 18.

From these data, the uptake rate is demonstrated by the fast capacity of the solvent, which refers to the overall $CO_2$ captured faster than 0.0009 l/s. Increasing water content has a profound effect of the solubility of the acetate salt; on the other hand, it is detrimental to the speed at which $CO_2$ is absorbed (entries 2-5). In the case of potassium acetate, the water content cannot be effectively lowered below 20% without phase separation. The more hydrophobic (or greasier) potassium isobutyrate allows for a reduction in water content (10%), which leads to superior $CO_2$ capture performance (entry 8). Two experiments with different initial $CO_2$ pressure were conducted to demonstrate that the system was able to capture low pressure $CO_2$, and that desorption was effective against considerable $CO_2$ backpressure (entries 6 and 7).

TABLE 18

Absorption Performance and Low Temperature Thermal Regeneration of Potassium Acetate Solutions in NMP-Water Mixed Solvent

| Entry | Water Content (V %)[a] | Concentration ($mol_{salt}$/L) | Fast Capacity ($mol_{CO2}$/L) | Full Capacity ($mol_{CO2}$/L) | Recovered $CO_2$ @80° C. (%)[b] |
|---|---|---|---|---|---|
| 1 | 10[c] | nd | nd | nd | nd |
| 2 | 20 | 3.12 | 0.67 | 1.38 | 63 |
| 3 | 30 | 4.22 | 0.37 | 1.41 | 63 |
| 4 | 40 | 5.50 | 0.08 | 1.36 | 65 |
| 5 | 50 | 6.22 | 0.09 | 1.29 | 68 |
| 6 | 20[d] | 3.12 | 0.13 | 0.67 | 64 |
| 7 | 20[e] | 3.12 | 1.08 | 1.74 | 55 |
| 8 | 10[f] | 1.73 | 0.96 | 1.32 | 48 |

[a]KOAc solution in NMP-water mixture saturated @20° C., 10 mL of solvent was injected to VLE under 1 bara $CO_2$ atmosphere;
[b]The carbon rich solution was heated up to 80° C. without changing the NMP/water ratio of the mixture;
[c]Phase separation was observed upon dissolving the salt;
[d]10 mL of solvent was injected to VLE under 0.5 bara $CO_2$ atmosphere;
[e]10 mL of solvent was injected to VLE under 1.5 bara $CO_2$ atmosphere;
[f]K-iso-butyrate was used under 1 bara $CO_2$ atmosphere Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

1. Intergovernmental Panel on Climate Change Report, Climate Change 2007: The Physical Science Basis, http://www.ipcc.ch.
2. Khatri, R. A., Chuang, S. S. C., Soong, Y. and Gray, M., *Energy and Fuels*, 2006, 20, 1514.
3. Song, C., *Catalysis Today*, 2006, 115, 2.
4. Idem, R. and Tontiwachwuthikul, P., *Ind. Eng. Chem. Res.*, 2006, 45, 2413.
5. Freund, P., *Proc. Instn. Mech. Engrs. Part A: J. Power and Energy*, 2003, 217, 1.
6. Steeneveldt, R., Berger, B. and Torp, T. A., *Trans. IChemE, Part A, Chem. Eng. Res. and Design*, 2006, 84(A9), 739.
7. MacDowell, N., Florin, N., Buchard, A., Hallett, J., Galindo, A., Jackson, G., Adjiman, C. S., Williams, C. K., Shah, N. and Fennell, P., Energy Environ. Sci., 2010, 3, 1645.
8. Calculated from http://www.planetark.com/dailynewsstory.cfm/newsid/40403/story.htm.
9. Jassim, M. S. and Rochelle, G. T., *Ind. Eng. Chem. Res.*, 2006, 45, 2465.
10. Poplsteinova, J., Krane, J. and Svendsen, H. F., *Ind. Eng. Chem. Res.*, 2005, 44, 9894; Yoon, S. Y., Lee, H., *Chem. Lett.*, 2003, 32, 344; Park, J-Y., Yoon, S. J. and Lee, H., *Environ. Sci. Technol.*, 2003, 37, 1670. For more recent studies, see McCann, N., Phan, D., Attalla, M., Puxty, G., Fernandes, D., Conway, W., Wang, X., Burns, R., van Altena, I., Lawrance, G. and Maeder, M., *Energy Procedia* 1, 2009, 955; McCann, N., Phan, D., Wang, X., Conway, W., Burns, R., Attalla, M., Puxty, G. and Maeder, M., *J. Phys. Chem. A*, 2009. 113, 5022.
11. Idem, R. O., Wilson, M., Tontiwachwuthikul, P., Chakma, A., Veawab, A., Aronwilas, A. and Gelowitz, D., *Ind. Eng. Chem. Res.*, 2006, 45, 2414.
12. Bara, J. E., *GHG Sci. Technol.*, 2012, 2, 1-10.
13. Abanades, J. C., Rubin, E. S. and Anthony, E. J., *Ind. Eng. Chem. Res.*, 2004, 43, 3462; Bello, A. and Idem, R. O., *Ind. Eng. Chem Res.*, 2005, 44, 945; Uyanga, I. J. and Idem, R. O., *Ind. Eng. Chem. Res.*, 2007, 46, 2558.
14. Yu, H., Xiang, Q., Fang, M., Yang, Q. and Feron, P. *GHG Sci. Technol.*, 2012, 2, 1-9.
15. Delfort, B., Carrette, P. L., FR-A-2909010; Heldebrandt, D. J., Yonker, C. R., Jessop, P. G., and Phan, L., *Energy Environ. Sci.*, 2008, 1, 487.
16. Scholes, C. A., Stevens, G. W. and Kentish, S. E. *Fuel*, 2012, 96, 15.
17. Ren, J., Wu, L. and Li, B-G. *Ind. Eng. Chem. Res.*, 2013, 52, 8565.
18. Wang, C., Luo, X., Luo, H., Jiang, D., Li, H. and Dai, S., *Angew. Chem. Int. Ed.*, 2011, 50, 4918.
19. Tornow, C. E., Thorson, M. R., Ma, S., Gerwith, A. A. and Kenis, P. J. A., *J. Am. Chem. Soc.*, 2012, 134, 19520.
20. Chen, K., Lin, R., Liao, P., He, C. Lin, J., Xue, W., Zhang, Y., Zhang, J. and Chen, X., *Crystal Growth and Design*, 2013, 13, 2118; Zhai, Q., Lin, Q., Wu, T., Wang, L., Zheng, S., Bu, X. and Feng, P., *Chem. of Materials*, 2012, 24, 2624.

The invention claimed is:

1. A method for the capture of $CO_2$ in a composition, the release of said $CO_2$ from said composition, and the subsequent regeneration of said composition for re-use, said method comprising performing, in order, the steps of:
   (a) capturing $CO_2$ by contacting said $CO_2$ with a capture composition comprising at least one alkali metal salt of an non-amino-acid alkyl monocarboxylic acid, at least one non-aqueous solvent and at least one protic solvent selected from water and an alcoholic solvent; wherein said at least one alkali metal salt of an non-amino-acid alkyl monocarboxylic acid is initially present in said composition at a level of between 1M and 14M; and wherein the components of the composition are selected such that the pKa of the at least one non-amino-acid alkyl monocarboxylic acid that is present in the capture composition in the form of the at least one metal salt is increased relative to the pKa of said at least one non-amino-acid alkyl monocarboxylic acid in water; and the pKa of said $CO_2$ in the capture composition is increased relative to the pKa of said $CO_2$ in water; and wherein the resultant relative magnitudes of the pKas of said $CO_2$ and non-amino-acid alkyl monocarboxylic acid in the capture composition cause the capture composition to capture said $CO_2$;
   (b) releasing said $CO_2$ by subjecting said composition to the application of heat and/or stripping with a stream of air or releasing said $CO_2$ by adding at least one release agent to said composition; and
   (c) regenerating the capture composition by cooling or regenerating the capture composition by partial or complete removal of the added release agent from said composition.

2. A method as claimed in claim 1 wherein said at least one non-aqueous solvent is a glycol ether.

3. A method as claimed in claim 2, wherein said glycol ether is selected from diethylene glycol dimethyl ether, diethylene glycol monobutyl ether, diethylene glycol monoethyl ether, diethylene glycol monomethyl ether, diethylene glycol monopropyl ether, dipropylene glycol dimethyl ether, ethylene glycol dimethyl ether, ethylene glycol monobutyl ether, ethylene glycol monoethyl ether, ethylene glycol monomethyl ether, ethylene glycol monopropyl ether, propylene glycol monobutyl ether and triethylene glycol dimethyl ether, propylene glycol dimethyl ether and diethylene glycol diethyl ether.

4. A method as claimed in claim 1 wherein said non-amino-acid alkyl monocarboxylic acid is selected from straight chained, branched or cyclic carboxylic acids which may be substituted or unsubstituted and/or wherein said at least one salt of an non-amino-acid alkyl monocarboxylic acid is selected from salts of $C_{1-20}$ non-amino-acid alkyl monocarboxylic acid.

5. A method as claimed in claim 4, wherein said non-amino-acid alkyl monocarboxylic acid is acetic acid, propionic acid, butyric acid, isobutyric acid, isovaleric acid or pivalic acid.

6. A method as claimed in claim 1, wherein the release agent is a further portion of the at least one protic solvent.

7. A method as claimed in claim 1 wherein said alkali metal is selected from lithium, sodium or potassium.

8. A method as claimed in claim 1 wherein said protic solvent is water.

9. A method as claimed in claim 1 wherein said protic solvent is present at levels of 5-20% v/v.

10. A method as claimed in claim 1 wherein said at least one non-aqueous solvent comprises at least one at least partially water-miscible polar solvent or at least one polar aprotic solvent.

11. A method as claimed in claim 1 wherein said at least one non-aqueous solvent is selected from dimethylsulphoxide (DMSO), N-methylpyrrolidinone (NMP), dimethylformamide (DMF), tetrahydrofuran (THF), 2-methyltetrahydrofuran, acetonitrile, sulfolane, 1,1,3,3-tetramethylurea (TMU), N,N'-dimethyl-N,N'-trimethyleneurea (1,3-dimethyl-3,4,5,6-tetrahydro-2-pyrimidinone (DMPU)), 1,3-dimethyl-2-imidazolidinone (DMI), dioxane, 1,3-dioxolane, lactate esters or polyethers.

12. A method as claimed in claim 1 wherein said at least one non-aqueous solvent is selected from dimethylsulphoxide (DMSO), tetrahydrofuran (THF), 2-methyltetrahydrofuran, sulfolane, dioxane, 1,3-dioxolane, lactate esters or polyethers.

13. A method as claimed in claim 1 wherein said composition comprises a solution, a slurry, a dispersion or a suspension.

14. A method as claimed in claim 1 wherein said $CO_2$ is contacted with the composition at pressures in the range of from 1 to 50 bar.

15. A method as claimed in claim 1 wherein said release of said $CO_2$ is achieved by heating up to 80° C. and optionally is achieved by heating to temperatures in the region of 30-80° C.

16. A method as claimed in claim 1 comprising performing, in order, the steps of:
 (a) capturing the $CO_2$ by contacting said $CO_2$ with a capture composition comprising at least one alkali metal salt of an non-amino-acid alkyl monocarboxylic acid, at least one non-aqueous solvent and at least one protic solvent selected from water and an alcoholic solvent; wherein said at least one alkali metal salt of an non-amino-acid alkyl monocarboxylic acid is initially present in said composition at a level of between 1M and 14M; and wherein the components of the composition are selected such that the pKa of the at least one non-amino-acid alkyl monocarboxylic acid that is present in the capture composition in the form of the at least one alkali metal salt is increased relative to the pKa of said at least one non-amino-acid alkyl monocarboxylic acid in water; and the pKa of $CO_2$ in the capture composition is increased relative to the pKa of $CO_2$ in water; and wherein the resultant relative magnitudes of the pKas of said $CO_2$ and non-amino-acid alkyl monocarboxylic acid in the capture composition cause the capture composition to capture said $CO_2$;
 (b) releasing said $CO_2$ by subjecting said composition to the application of heat and/or stripping with a stream of air; and
 (c) regenerating the capture composition by cooling.

* * * * *

(12) SUPPLEMENTAL EXAMINATION CERTIFICATE

United States Patent
Rayner et al.

(10) Number: 10,279,307 F1
(45) Certificate Issued: Nov. 17, 2022

Control No.: 96/000,415

Filing Date: Oct. 31, 2022

Primary Examiner: Jerry Johnson

No substantial new question of patentability is raised in the request for supplemental examination. See the Reasons for Substantial New Question of Patentability Determination in the file of this proceeding.

(56) Items of Information

FOREIGN PATENT DOCUMENTS

| WO | 2011/135378 A1 | 11/2011 |
| WO | 2013/144730 A2 | 10/2013 |
| WO | 2008/025743 A1 | 3/2008 |